US012596940B2

(12) United States Patent
Abrol et al.

(10) Patent No.: US 12,596,940 B2
(45) Date of Patent: Apr. 7, 2026

(54) SMART TRAINING AND SMART DEPLOYMENT OF MACHINE LEARNING MODELS

(71) Applicant: GE Precision Healthcare LLC, Milwaukee, WI (US)

(72) Inventors: Sidharth Abrol, Bangalore (IN);
Aanchal Mongia, New Delhi (IN);
Abhijit Patil, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 1078 days.

(21) Appl. No.: 17/652,236

(22) Filed: Feb. 23, 2022

(65) Prior Publication Data

US 2023/0267349 A1 Aug. 24, 2023

(51) Int. Cl.
*G06N 20/10* (2019.01)
*G06F 17/18* (2006.01)
*G06N 5/04* (2023.01)
*G06N 20/00* (2019.01)

(52) U.S. Cl.
CPC .............. *G06N 5/041* (2013.01); *G06F 17/18* (2013.01); *G06N 20/00* (2019.01)

(58) Field of Classification Search
CPC .......... G06N 5/041; G06N 20/00; G06N 3/08; G06N 3/04; G06F 17/18
See application file for complete search history.

(56) References Cited

U.S. PATENT DOCUMENTS

| | | | |
|---|---|---|---|
| 8,533,224 B2 | 9/2013 | Lin et al. | |
| 2016/0174902 A1* | 6/2016 | Georgescu ........... | G06V 10/454 600/408 |
| 2019/0065989 A1* | 2/2019 | Kida ...................... | G06N 3/048 |
| 2019/0310650 A1 | 10/2019 | Halder | |
| 2019/0378044 A1* | 12/2019 | Jeffery .................. | G06N 20/00 |
| 2020/0184278 A1* | 6/2020 | Zadeh .................... | G06N 3/044 |

(Continued)

FOREIGN PATENT DOCUMENTS

CN          107368892 A          11/2017

OTHER PUBLICATIONS

Shashikumar, S.P. et al. | Artificial intelligence sepsis prediction algorithm learns to say "I don't know", npj Digital Medicine (2021) 4:134 ; https://doi.org/10.1038/s41746-021-00504-6, 9 pages.

(Continued)

*Primary Examiner* — Brandon S Cole
(74) *Attorney, Agent, or Firm* — Amin, Turocy & Watson, LLP

(57) ABSTRACT
Systems/techniques that facilitate smart training and smart deployment of machine learning models are provided. In various embodiments, a system can access a first set of data candidates that are available for training of a machine learning model. In various aspects, the system can compute at least one feature distribution of the first set of data candidates. In various instances, the system can identify, in the first set of data candidates, a strict subset of data candidates, wherein at least one feature distribution of the strict subset of data candidates matches the at least one feature distribution of the first set of data candidates. In various cases, the system can train the machine learning model on the strict subset of data candidates.

20 Claims, 19 Drawing Sheets

(56) References Cited

U.S. PATENT DOCUMENTS

| 2021/0089960 | A1   | 3/2021  | Gupta et al.              |
| 2021/0342740 | A1 * | 11/2021 | Xu ..................... G06F 16/9535 |
| 2021/0358594 | A1 * | 11/2021 | Mellem ................. G16H 50/30 |
| 2022/0335066 | A1 * | 10/2022 | Hedayati ................ G06N 20/00 |
| 2023/0038256 | A1 * | 2/2023  | Tal ........................ G16B 40/00 |

OTHER PUBLICATIONS

Feng et al. | "Incremental Semi-Supervised classification of data streams via self-representative selection". Applied Soft Computing, vol. 47, Oct. 2016, pp. 389-394, 15 pages.

* cited by examiner

```
                                        ┌─────────────── 302
┌──────────────────┐         ┌──────────────────────────────┐
│ TRAINING FEATURE │         ┆                              ┆
│      1(1)        │         ┆  ┌────────────────────────┐  ┆
└──────────────────┘         ┆  │   TRAINING FEATURE     │  ┆
         •            ───────▶  │    DISTRIBUTION 1      │  ┆
         •                   ┆  └────────────────────────┘  ┆
         •                   ┆                              ┆
┌──────────────────┐         ┆                              ┆
│ TRAINING FEATURE │         ┆            •                 ┆
│      N(1)        │         ┆            •                 ┆
└──────────────────┘         ┆            •                 ┆
                             ┆                              ┆
┌──────────────────┐         ┆  ┌────────────────────────┐  ┆
│ TRAINING FEATURE │         ┆  │   TRAINING FEATURE     │  ┆
│      1(M)        │         ┆  │    DISTRIBUTION M      │  ┆
└──────────────────┘  ──────▶  └────────────────────────┘  ┆
         •                   └──────────────────────────────┘
         •
         •
┌──────────────────┐
│ TRAINING FEATURE │
│      N(M)        │
└──────────────────┘
```

SELECTED TRAINING
FEATURE 1(1)

•
•
•

SELECTED TRAINING
FEATURE $X$(1)

SELECTED TRAINING
FEATURE
DISTRIBUTION 1

•
•
•

SELECTED TRAINING
FEATURE 1($M$)

•
•
•

SELECTED TRAINING
FEATURE $X$($M$)

SELECTED TRAINING
FEATURE
DISTRIBUTION $M$

1200

1004

DEPLOYED FEATURE
1(1)

•
•
•

DEPLOYED FEATURE
Y(1)

DEPLOYED FEATURE
DISTRIBUTION 1

•
•
•

DEPLOYED FEATURE
1(M)

•
•
•

DEPLOYED FEATURE
Y(M)

DEPLOYED FEATURE
DISTRIBUTION M

1700

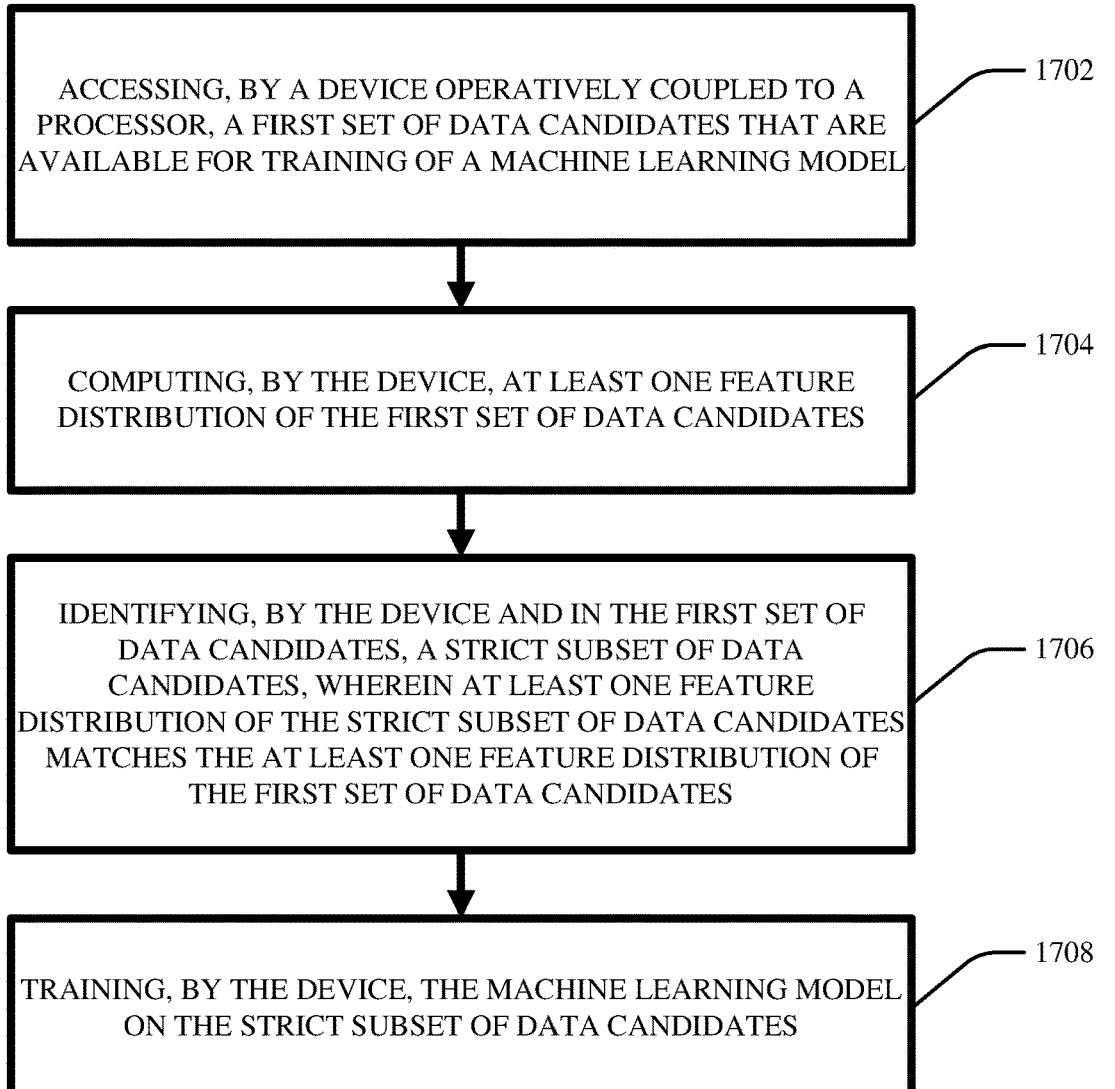

1702

ACCESSING, BY A DEVICE OPERATIVELY COUPLED TO A PROCESSOR, A FIRST SET OF DATA CANDIDATES THAT ARE AVAILABLE FOR TRAINING OF A MACHINE LEARNING MODEL

1704

COMPUTING, BY THE DEVICE, AT LEAST ONE FEATURE DISTRIBUTION OF THE FIRST SET OF DATA CANDIDATES

1706

IDENTIFYING, BY THE DEVICE AND IN THE FIRST SET OF DATA CANDIDATES, A STRICT SUBSET OF DATA CANDIDATES, WHEREIN AT LEAST ONE FEATURE DISTRIBUTION OF THE STRICT SUBSET OF DATA CANDIDATES MATCHES THE AT LEAST ONE FEATURE DISTRIBUTION OF THE FIRST SET OF DATA CANDIDATES

1708

TRAINING, BY THE DEVICE, THE MACHINE LEARNING MODEL ON THE STRICT SUBSET OF DATA CANDIDATES

FIG. 17

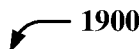
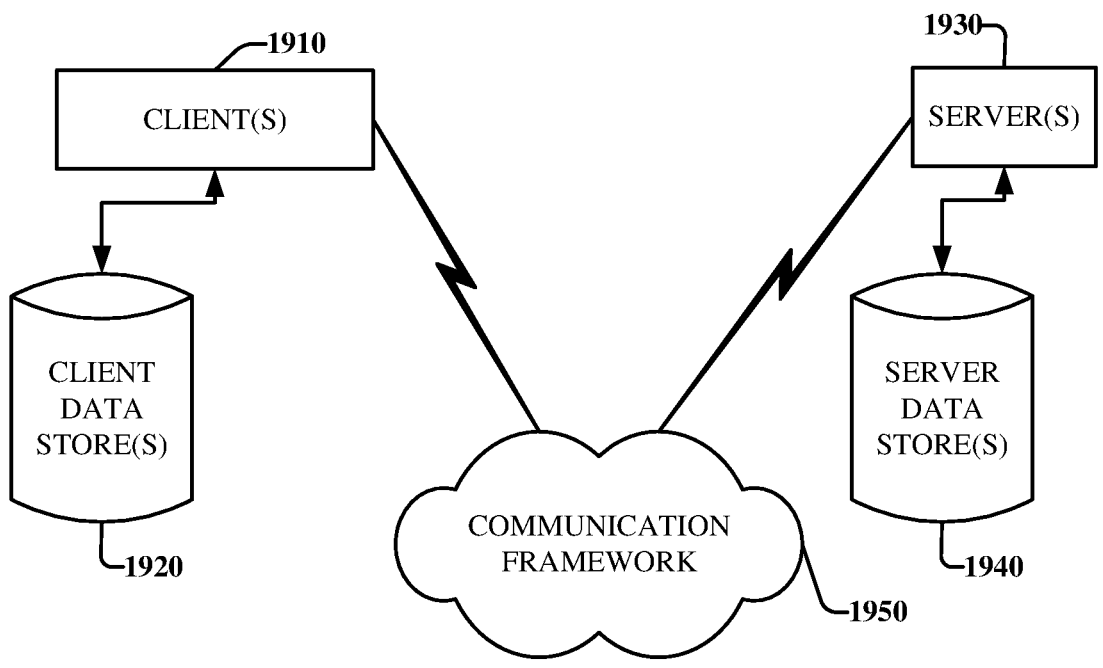
FIG. 19

SMART TRAINING AND SMART DEPLOYMENT OF MACHINE LEARNING MODELS

TECHNICAL FIELD

The subject disclosure relates generally to machine learning models, and more specifically to smart training and/or smart deployment of machine learning models.

BACKGROUND

Machine learning models are implemented in two phases: a training phase, and a deployment/inferencing phase. During the training phase, a machine learning model is iteratively trained to accurately perform its desired functionality, transformation, and/or determination. During the deployment/inferencing phase, the machine learning model is executed, post-training, on real-world data, so that the desired functionality, transformation, and/or determination is applied to such real-world data.

Unfortunately, existing techniques for training and deploying machine learning models suffer from various disadvantages. Specifically, when a training phase of a machine learning model is implemented via existing techniques, there exists a significant likelihood that the machine learning model becomes overtrained and/or overfitted. Moreover, when a deployment/inferencing phase is implemented via existing techniques, there exists a significant likelihood that the machine learning model cannot accurately analyze certain real-world data despite having been trained.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate smart training and/or smart deployment of machine learning models are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various cases, the receiver component can access a first set of data candidates that are available for training of a machine learning model. In various aspects, the computer-executable components can further comprise a feature component. In various cases, the feature component can compute at least one feature distribution of the first set of data candidates. In various instances, the computer-executable components can further comprise a selection component. In various cases, the selection component can identify, in the first set of data candidates, a strict subset of data candidates, wherein at least one feature distribution of the strict subset of data candidates matches the at least one feature distribution of the first set of data candidates. In various aspects, the computer-executable components can further comprise a training component. In various cases, the training component can train the machine learning model on the strict subset of data candidates.

According to one or more embodiments, the above-described system can be implemented as a computer-implemented method and/or a computer program product.

DESCRIPTION OF THE DRAWINGS

FIG. 4 illustrates an example, non-limiting block diagram showing how a set of training feature distributions can be computed in accordance with one or more embodiments described herein.

FIG. 17 illustrates a flow diagram of an example, non-limiting computer-implemented method that facilitates smart training and/or smart deployment of machine learning models in accordance with one or more embodiments described herein.

FIG. 19 illustrates an example networking environment operable to execute various implementations described herein.

DETAILED DESCRIPTION

Figure 1:
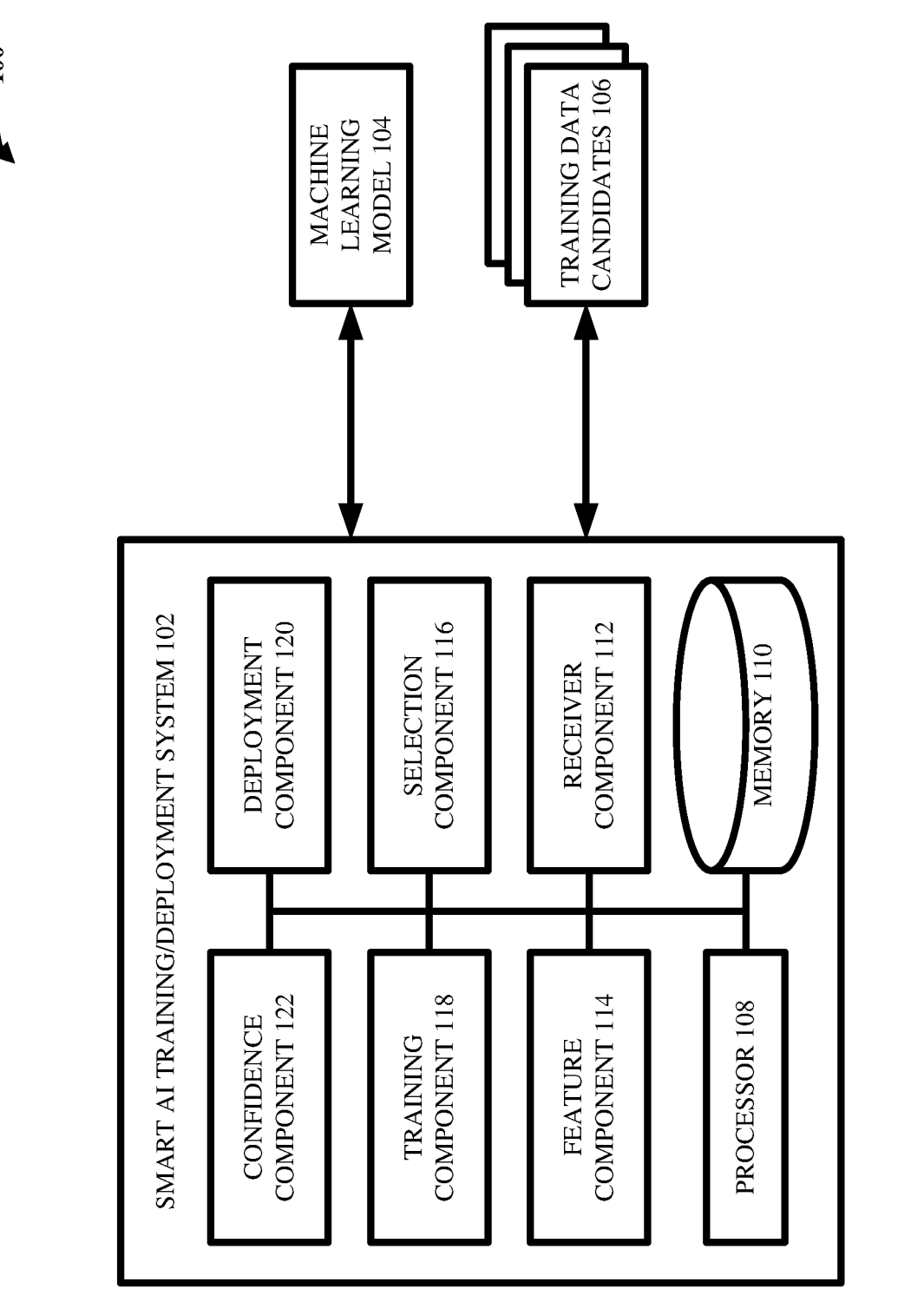
FIG. 1 illustrates a block diagram of an example, non-limiting system that facilitates smart training and/or smart deployment of machine learning models in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning models (e.g., neural networks, support vector machines, naïve Bayes models, linear and/or logistic regression models, decision tree models) can be implemented in two phases: a training phase, and a deployment/inferencing phase. During the training phase, a machine learning model can be iteratively trained (e.g., via back-propagation for neural networks, via sample splitting for decision trees) to accurately perform its desired functionality, transformation, and/or determination (e.g., in some cases, a machine learning model can be desired to classify inputted data; in other cases, a machine learning model can be desired to segment inputted data; in still other cases, a machine learning model can be desired to synthesize/forecast output data based on inputted data). During the deployment/inferencing phase (e.g., which occurs after training), the machine learning model can be executed on real-world data, so that the desired functionality, transformation, and/or determination can be applied to such real-world data (e.g., so that such real-world data can be classified, so that such real-world data can be segmented, and/or so that output data can be synthesized/forecasted based on such real-world data).

Unfortunately, existing techniques for training and/or deploying machine learning models suffer from various disadvantages. Specifically, when a training phase of a machine learning model is implemented via existing techniques, there exists a significant likelihood that the machine learning model becomes overtrained and/or overfitted. In other words, when in an overtrained/overfitted state, the machine learning model can be considered as attempting to describe the random error exhibited by data on which it has been trained, rather than as attempting to describe the more generalizable relationships between the variables of the data on which it has been trained. Thus, such overtraining and/or overfitting can significantly reduce the generalizability of the machine learning model, which is undesirable.

Moreover, when a deployment/inferencing phase is implemented via existing techniques, there exists a significant likelihood that the machine learning model cannot accurately analyze certain real-world data despite having been trained. In particular, even if not overtrained/overfitted, the machine learning model can be accurately executed only on real-world data that is sufficiently "similar" to the data on which it has been trained. If the machine learning model is executed on a given piece of data which is not sufficiently "similar" to the data on which the machine learning model has been trained, any results produced by the machine learning model based on such given piece of data cannot be considered as reliable. Unfortunately, existing techniques take no steps whatsoever to prevent execution of the machine learning on such insufficiently "similar" data, which is undesirable.

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate smart training and/or smart deployment of machine learning models.

In some aspects, the inventors of various embodiments described herein recognized that existing techniques for training machine learning models can cause overtraining/overfitting, precisely because such existing techniques utilize an overabundance of redundant training data. Accordingly, the present inventors realized that overtraining/overfitting can be mitigated and/or ameliorated by preventing the machine learning model from being trained on such redundant training data. More specifically, when given a total set of training data on which it is desired to train a machine learning model, such total set of training data can exhibit particular feature distributions. The present inventors realized that there can exist a subset of such total set of training data, where the subset can include less training data that the total set (e.g., the subset can be a strict subset and/or a proper subset), and where the feature distributions exhibited by the subset can match (e.g., can be not statistically significantly different from) the particular feature distributions of the total set. Thus, the machine learning model can be trained on such subset instead of on the total set. Since the subset can be strict/proper (e.g., can contain less data than the total set), the likelihood of overtraining/overfitting can be reduced by training the machine learning model on the subset rather than on the total set. Moreover, since the subset can have statistically significantly similar feature distributions as the total set, the machine learning model can be considered as not missing out on substantive learning when it is trained on the subset rather than on the total set. In some cases, the subset can be considered as a minimally-required training set. In various aspects, training the machine learning model on such subset rather than on the total set can be referred to as "smart training."

Furthermore, the present inventors recognized that existing techniques for deploying/inferencing machine learning models can be vulnerable to unreliability, precisely because such existing techniques do not take into consideration the feature distributions exhibited by deployment data (e.g., exhibited by data on which it is desired to execute a machine learning model post-training). Accordingly, the present inventors realized that unreliability during deployment/inferencing of a machine learning model can be mitigated and/or ameliorated by considering the feature distributions of deployment data. More specifically, when given a first dataset on which a machine learning model has been trained, such first dataset can exhibit first feature distributions. Furthermore, when given a second dataset on which it is desired to execute the machine learning model post-training, such second dataset can exhibit second feature distributions. If the second feature distributions match (e.g., are not statistically significantly different from) the first feature distributions, then it can be concluded that the machine learning model can be reliably executed on the second dataset (e.g., it can be concluded that the second dataset is sufficiently "similar" to the first dataset). On the other hand, if the second feature distributions do not match (e.g., are statistically significantly different from) the first feature distributions, then it can be concluded that the machine learning model cannot be reliably executed on the second dataset (e.g., it can be concluded that the second dataset is not sufficiently "similar" to the first dataset). In various instances, deploying/inferencing the machine learning model only on deployment data which exhibits feature distributions that match those of the data on which the machine learning model was trained can be referred to as "smart deployment."

In various aspects, various embodiments described herein can be considered as a computerized tool (e.g., any suitable combination of computer-executable hardware and/or computer-executable software) that can facilitate smart training and/or smart deployment of machine learning models. In other words, the computerized tool can be considered as an automated platform that operates in any suitable computing foreground and/or any suitable computing background (e.g., stealth operation), that can cause any suitable machine learning model to undergo smart training and/or smart deployment. In various instances, the computerized tool can comprise a receiver component, a feature component, a selection component, a training component, and/or a deployment component.

In various embodiments, there can be a total set of training data candidates. In various aspects, the total set of training data candidates can include any suitable number of training data candidates. In various instances, each training data candidate can be any suitable electronic information that has any suitable format and/or dimensionality as desired (e.g., a training data candidate can be a collection of timeseries data, a training data candidate can be a collection of waveform data, a training data candidate can be a two-dimensional pixel array and/or three-dimensional voxel array). In any case, each training data candidate can exhibit and/or otherwise be associated with any suitable number of features (e.g., for timeseries data, a feature can be an average timeseries value, a max timeseries value, and/or a min timeseries value; for waveform data, a feature can be a frequency spectra value, a max amplitude value, and/or a min amplitude value; for image data, a feature can be an average pixel/voxel intensity value, a max pixel/voxel intensity value, and/or a min pixel/voxel intensity value). In some cases, the total set of training data candidates can be annotated. In other cases, the total set of training data candidates can be unannotated.

In various embodiments, there can be a machine learning model. In various aspects, the machine learning model can exhibit any suitable artificial intelligence architecture as desired (e.g., neural network, support vector machine, naïve Bayes, linear and/or logistic regression, decision tree). In various instances, the machine learning model can be configured to receive as input any one of the total set of training data candidates, and to produce as output some determination, prediction, and/or result that is based on the inputted training data candidate (e.g., in some cases, the machine learning model can be configured to classify an inputted data candidate; in other cases, the machine learning model can be configured to segment an inputted data candidate; in still other cases, the machine learning model can be configured to synthesize and/or forecast new data based on an inputted data candidate).

In any case, it can be desired to train the machine learning model by leveraging the total set of training data candidates. That is, if the total set of training data candidates is annotated, it can be desired to train the machine learning model in supervised fashion via the total set of training data candidates. In contrast, if the total set of training data candidates is instead unannotated, it can be desired to train the machine learning model in unsupervised fashion and/or reinforcement learning fashion via the total set of training data candidates. Regardless, it can be desired to train the machine learning model based on the total set of training data candidates, so that a likelihood of overtraining and/or overfitting of the machine learning model is reduced. In various cases, the computerized tool described herein can facilitate such training.

In various embodiments, the receiver component of the computerized tool can electronically receive and/or otherwise electronically access the total set of training data candidates and/or the machine learning model. In some aspects, the receiver component can electronically retrieve the total set of training data candidates and/or the machine learning model from any suitable centralized and/or decentralized data structure (e.g., graph data structure, relational data structure, hybrid data structure), whether remote from and/or local to the receiver component. In any case, the receiver component can electronically obtain and/or access the total set of training data candidates and/or the machine learning model, such that other components of the computerized tool can electronically interact with (e.g., read, write, edit, copy, manipulate) the total set of training data candidates and/or the machine learning model.

In various embodiments, the feature component of the computerized tool can electronically compute one or more training feature distributions that are associated with the total set of training data candidates. As mentioned above, each training data candidate can include and/or be associated with any suitable number of features. For ease of explanation, suppose that each training data candidate includes q features, for any suitable positive integer q. Accordingly, the feature component can calculate q training feature distributions for the total set of training data candidates, one training feature distribution per feature. More specifically, for any suitable positive integer r where $1 \leq r \leq q$, the feature component can compute an r-th training feature distribution, where the r-th training feature distribution describes how the value of the r-th feature is distributed throughout the total set of training data candidates. In some cases, if the r-th feature distribution is a normal distribution, it can be represented by an r-th mean, an r-th variance, and/or an r-th median. In other cases, if the r-th feature distribution is a gamma distribution, it can be represented by an r-th shape parameter, an r-th rate parameter, and/or an r-th median. In any case, the feature component can generate one or more training feature distributions of the total set of training data candidates.

In various embodiments, the selection component of the computerized tool can electronically identify, within and/or from the total set of training data candidates, a selected subset of training data candidates. In various instances, the selected subset can contain fewer training data candidates than the total set (e.g., the selected subset can be a strict and/or proper subset). Furthermore, in various aspects, the selection component can electronically compute one or more selected training feature distributions that are associated with the selected subset. Note that, if the one or more training feature distributions computed by the feature component include q distributions (e.g., each describing how a respectively corresponding feature is distributed throughout the total set of training data candidates), then the one or more selected training feature distributions computed by the selection component can also include q distributions (e.g., each describing how a respectively corresponding feature is distributed throughout the selected subset of training data candidates). In various instances, the selection component can choose the selected subset, such that the one or more selected training feature distributions respectively match (e.g., are respectively not statistically significantly different from) the one or more training feature distributions.

More specifically, the selection component can identify the selected subset in iterative fashion, as follows. First, the selection component can create an initially-empty set to serve as the selected subset. Next, the selection component can iteratively insert, from the total set of training data candidates, training data candidates that are not yet within the selected subset. That is, the selected subset can increase in size at each iteration, meaning that the set of selected training feature distributions can change at each iteration. In various cases, at each iteration, the selection component can compute the one or more selected training feature distributions of the selected subset, and the selection component can respectively compare the one or more selected training feature distributions to the one or more training feature distributions computed by the feature component. In various aspects, such comparison can be facilitated via statistical hypothesis tests, such as z-tests, t-tests, and/or Kolmogorov-Smirnov tests. For example, if there are q training feature distributions and q selected training feature distributions, then for every positive integer s where $1 \leq s \leq q$, the selection component can compare, via a statistical hypothesis test, the s-th training feature distribution with the s-th selected training feature distribution. If the selection component determines that the one or more selected training feature distributions do not yet respectively match the one or more training feature distributions computed by the feature component (e.g., if the selection component determines that the t-th training feature distribution is statistically significantly different from the t-th selected training feature distribution for at least one positive integer t with $1 \leq t \leq q$), the selection component can proceed to the next iteration (e.g., can insert another training data candidate into the selected subset, recompute the one or more selected training feature distributions, and compare the one or more recomputed selected training feature distributions to the one or more training feature distributions). In contrast, if the selection component instead determines that the one or more selected training feature distributions now respectively match the one or more training feature distributions computed by the feature component (e.g., if the selection component determines that the u-th training feature distribution is not statistically significantly different from the u-th selected training feature distribution for all positive integers u with $1 \leq u \leq q$), the selection component can cease the iterations, and the selected subset can be considered as complete and/or identified.

In various embodiments, once the selection component identifies the selected subset, the training component of the computerized tool can electronically train the machine learning model on the selected subset. As those having ordinary skill in the art will appreciate, if the training data candidates are annotated, then the training component can perform supervised training of the machine learning model on the selected subset. On the other hand, if the training data candidates are unannotated, then the training component can perform unsupervised training and/or reinforcement learning of the machine learning model on the selected subset. In any case, the machine learning model can be trained on the selected subset of training data candidates, rather than on the total set of training data candidates. Because the selected subset can have fewer training data candidates than the total set, training the machine learning model on the selected subset can have a lower likelihood of causing overtraining and/or overfitting of the machine learning model. Moreover, because the one or more selected training feature distributions can match (e.g., can be not statistically significantly different from) the one or more training feature distributions of the total set of training data candidates, the selected subset can be considered as being substantively equivalent, for training purposes, to the total set. Therefore, training the machine learning model on the selected subset rather than on the total set can be beneficial (e.g., can reduce chances of overtraining/overfitting, without reducing substantive learning that is achieved by the machine learning model). As mentioned above, this can be referred to as "smart training" of the machine learning model.

In this way, the computerized tool can be considered as an automated platform for facilitating smart training of the machine learning model. In some cases, the computerized tool can visually render, on any suitable computer display/screen/monitor, any suitable results that are associated with such smart training. For example, in some cases, the selection component can visually render results of any statistical hypothesis tests that it performs (e.g., can render/display computed p-values at each iteration). As another example, in some cases, the selection component can visually render any of the set of selected training feature distributions (e.g., as histograms and/or violin plots). As still another example, in some cases, the feature component can visually render any of the set of training feature distributions (e.g., as histograms and/or violin plots). Accordingly, in various aspects, the computerized tool can be considered as creating a visual dashboard that depicts any suitable information pertaining to the smart training of the machine learning model.

Now that smart training by the computerized tool has been described, consider how the computerized tool can perform smart deployment.

In various embodiments, the receiver component can further access a set of deployed data candidates on which is it desired to execute, deploy, and/or otherwise inference the machine learning model post-training. In various cases, a deployed data candidate can have the same format and/or dimensionality as a training data candidate, as described above.

In various embodiments, the deployment component of the computerized tool can electronically compute one or more deployed feature distributions of the set of deployed data candidates. Note that, if the one or more training feature distributions computed by the feature component include q distributions (e.g., each describing how a respectively corresponding feature is distributed throughout the total set of training data candidates), and/or if the one or more selected training feature distributions computed by the selection component include q distributions (e.g., each describing how a respectively corresponding feature is distributed throughout the selected subset of training data candidates), then the one or more deployed feature distributions computed by the deployment component can also include q distributions (e.g., each describing how a respectively corresponding feature is distributed throughout the set of deployed data candidates).

In various instances, the deployment component can respectively compare (e.g., via statistical hypothesis tests, such as z-tests, t-tests, and/or Kolmogorov-Smirnov tests) the one or more deployed feature distributions with the one or more training feature distributions (e.g., and/or with the one or more selected training feature distributions). For example, for all positive integers v with $1 \leq v \leq q$, the selection component can perform a statistical hypothesis test to determine whether the v-th deployed feature distribution is statistically significantly different from the v-th training feature distribution (and/or from the v-th selected training feature distribution). If the w-th deployed feature distribution is not statistically significantly different from the w-th training feature distribution (and/or from the w-th selected training feature distribution) for all positive integers w where $1 \leq w \leq q$, then the deployment component can conclude that the set of deployed data candidates is sufficiently "similar" to the total set of training data candidates (e.g., and/or to the selected subset of training data candidates). That is, the deployment component can conclude that the machine learning model can be reliably executed on the set of deployed data candidates. On the other hand, if the w-th deployed feature distribution is statistically significantly different from the w-th training feature distribution (and/or from the w-th selected training feature distribution) for at least on positive integer w with $1 \leq w \leq q$, then the deployment component can conclude that the set of deployed data candidates is not sufficiently "similar" to the total set of training data candidates (e.g., and/or to the selected subset of training data candidates). That is, the deployment component can conclude that the machine learning model cannot be reliably executed on the set of deployed data candidates. In various aspects, determining whether the machine learning model can be reliably executed on the set of deployed data candidates in this way can be referred to as "smart deployment" of the machine learning model.

In this way, the computerized tool can be considered as an automated platform for facilitating smart deployment of the machine learning model. In some cases, the computerized tool can visually render, on any suitable computer display/screen/monitor, any suitable results that are associated with such smart deployment. For example, in some cases, the deployment component can visually render results of any statistical hypothesis tests that it performs (e.g., can render/display computed p-values). As another example, in some cases, the deployment component can visually render any of the set of deployed feature distributions (e.g., as histograms and/or violin plots). Accordingly, in various aspects, the computerized tool can be considered as creating a visual dashboard that depicts any suitable information pertaining to the smart deployment of the machine learning model.

Accordingly, various embodiments described herein can include a computerized tool that can facilitate smart training and/or smart deployment of machine learning models. As described herein, smart training can involve reducing a likelihood of overtraining/overfitting by removing substantively redundant data from a total set of available training data. As also described herein, smart deployment can involve recommending and/or permitting execution of a machine learning model on a set of deployment data only when the set of deployment data is determined to be sufficiently "similar" to a set of training data. In any case, the computerized tool described herein can improve how machine learning models are trained and/or deployed.

Various embodiments of the subject innovation can be employed to use hardware and/or software to solve problems that are highly technical in nature (e.g., to facilitate smart training and/or smart deployment of machine learning models), that are not abstract and that cannot be performed as a set of mental acts by a human. Further, some of the processes performed can be performed by a specialized computer (e.g., machine learning model, such as a neural network, a support vector machine, a decision tree model) for carrying out defined tasks related to smart training and/or smart deployment. For example, such defined tasks can include: accessing, by a device operatively coupled to a processor, a first set of data candidates that are available for training of a machine learning model; computing, by the device, at least one feature distribution of the first set of data candidates; identifying, by the device and in the first set of data candidates, a strict subset of data candidates, wherein at least one feature distribution of the strict subset of data candidates matches the at least one feature distribution of the first set of data candidates; and training, by the device, the machine learning model on the strict subset of data candidates. Such defined tasks can further include: accessing, by the device, a second set of data candidates that are available for inferencing of the machine learning model; determining, by the device, whether at least one feature distribution of the second set of data candidates matches the at least one feature distribution of the first set of data candidates; and recommending, by the device, that the machine learning model is not reliably executable on the second set of data candidates when the at least one feature distribution of the second set of data candidates fails to match the at least one feature distribution of the first set of data candidates.

Such defined tasks are not performed manually by humans. Indeed, neither the human mind nor a human with pen and paper can electronically receive training data, electronically identify a minimally-required subset of such training data, and electronically train a machine learning model on such minimally-required subset. Moreover, neither the human mind nor a human with pen and paper can electronically receive a set of deployment data, can electronically compare, via statistical hypothesis tests, feature distributions of such deployment data with feature distributions of the training data, and electronically recommend whether the machine learning model can be reliably executed on the deployment data based on such comparison. Instead, various embodiments of the subject innovation are inherently and inextricably tied to computer technology and cannot be implemented outside of a computing environment (e.g., a machine learning model, such as a decision tree model and/or a neural network, is an inherently-computerized construct that simply cannot be implemented in any way by the human mind without computers; accordingly, a computerized tool that identifies a minimally-required training dataset, that trains a machine learning model on such minimally-required training dataset, that compares feature distributions of a deployed dataset with feature distributions of such minimally-required training dataset, and that determines how reliably the machine learning model can be executed on the deployed dataset based on such comparison is likewise inherently-computerized and cannot be implemented in any sensible, practical, or reasonable way without computers).

Moreover, various embodiments of the subject innovation can integrate into a practical application various teachings described herein relating to smart training and/or smart deployment of machine learning models. As explained above, existing techniques for implementing training of a machine learning model can cause the machine learning model to become overtrained/overfitted, which significantly reduces the generalizability of the machine learning model. As also explained above, existing techniques for implementing deployment of a machine learning model can cause the machine learning model to be unreliably executed (e.g., to be executed on inappropriate data).

In stark contrast, various embodiments described herein can address and/or ameliorate these significant technical problems. Specifically, various embodiments described herein include a computerized tool that can facilitate smart training of a machine learning model. That is, when given a total set of available training data, such computerized tool can identify a strict subset of such total set, where the strict subset contains fewer/less training data that the total set, but where feature distributions exhibited by the strict subset are statistically significantly similar to feature distributions exhibited by the total set. Since the strict subset can have less/fewer data that the total set, the machine learning model can be trained on the strict subset with a lower risk of overtraining/overfitting. Moreover, since the feature distributions of the strict subset can match those of the total set, the strict subset can be considered as being substantively equivalent to the total set (e.g., the strict subset can be considered as missing and/or leaving out only substantively redundant information as compared to the total set). Thus, the computerized tool can train the machine learning model on the strict subset, rather than on the total set, which can be beneficial.

Moreover, the computerized tool described herein can further facilitate smart deployment of the machine learning model. That is, when given a deployment dataset, the computerized tool can compare feature distributions of the deployment dataset with those of a training dataset (e.g., the total set and/or the strict subset). If the feature distributions of the deployment dataset respectively match those of the training dataset, then the computerized tool can conclude that the machine learning model can be reliably executed on the deployment dataset. In such case, the computerized tool can execute (and/or can recommend executing) the machine learning model on the deployment dataset. In contrast, if the feature distributions of the deployment dataset do not respectively match those of the training dataset, then the computerized tool can conclude that the machine learning model cannot be reliably executed on the deployment dataset. In such case, the computerized tool can prohibit/prevent (and/or recommend against) the execution of the machine learning model on the deployment dataset.

Accordingly, various embodiments described herein can train a machine learning model in such a way as to reduce probability of overtraining/overfitting, and various embodiments can deploy a machine learning model in such a way as to increase reliability of the machine learning model. Such a computerized tool certainly constitutes a concrete and tangible technical improvement in the field of machine learning models. Therefore, various embodiments described herein clearly qualify as useful and practical applications of computers.

Furthermore, various embodiments of the subject innovation can control real-world tangible devices based on the disclosed teachings. For example, various embodiments of the subject innovation can electronically train and/or execute real-world machine learning models (e.g., decision trees, neural networks).

It should be appreciated that the herein figures and description provide non-limiting examples of the subject innovation and are not necessarily drawn to scale.

FIG. 1 illustrates a block diagram of an example, non-limiting system 100 that can facilitate smart training and/or smart deployment of machine learning models in accordance with one or more embodiments described herein. As shown, a smart artificial intelligence (AI) training/deployment system 102 can be electronically integrated, via any suitable wired and/or wireless electronic connections, with a machine learning model 104 and/or with a set of training data candidates 106.

In various embodiments, the set of training data candidates 106 can include any suitable number of training data candidates. In various aspects, each training data candidate can be considered as any suitable piece of electronic information (e.g., having any suitable data format and/or any suitable data dimensionality) that is associated with one or more features, attributes, and/or characteristics. This is shown in more detail with respect to FIG. 2.

Figure 2:
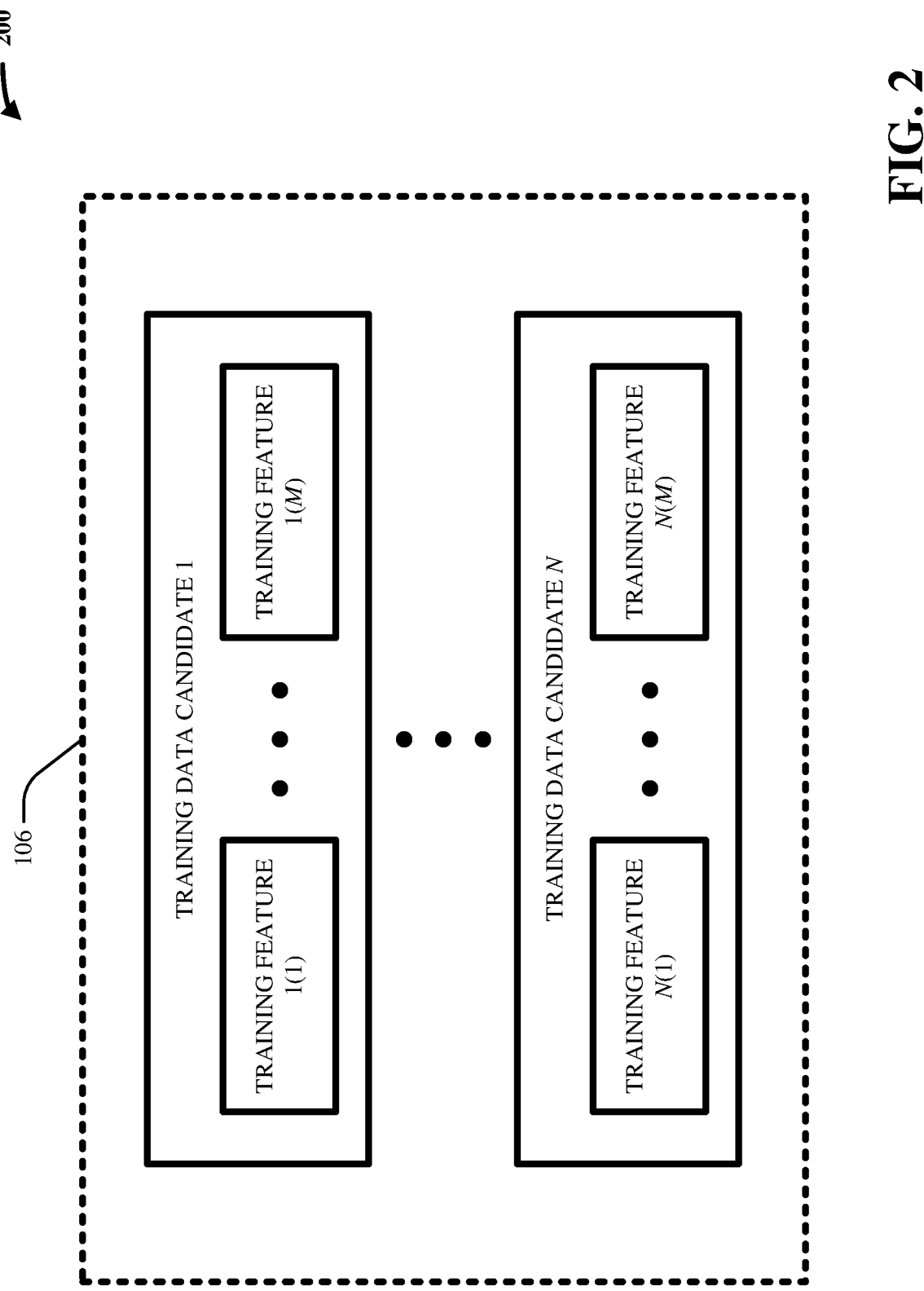
FIG. 2 illustrates an example, non-limiting block diagram of a set of training data candidates in accordance with one or more embodiments described herein.

FIG. 2 illustrates an example, non-limiting block diagram 200 of a set of training data candidates in accordance with one or more embodiments described herein. That is, FIG. 2 depicts a non-limiting, example embodiment of the set of training data candidates 106.

As shown, in various aspects, the set of training data candidates 106 can include n data candidates for any suitable positive integer n: a training data candidate 1 to a training data candidate n. As also shown, in various instances, each training data candidate can be considered as a sample of data (e.g., a sample of timeseries data, a sample of waveform data, a sample of image data, and/or any suitable combination thereof) that is associated with any suitable number of features. As those having ordinary skill in the art will appreciate, a feature can be one or more scalars, one or more vectors, one or more matrices, one or more tensors, one or more character strings, and/or any suitable combination thereof that can describe and/or otherwise characterize a respectively corresponding training data candidate. As some non-limiting examples, a feature can be: a mean of a respectively corresponding training data candidate; a median of a respectively corresponding training data candidate; a mode of a respectively corresponding training data candidate; a maximum value of a respectively corresponding training data candidate; a minimum value of a respectively corresponding training data candidate; a skewness of a respectively corresponding training data candidate; a size and/or cardinality of a respectively corresponding training data candidate; a binned entropy of a respectively corresponding training data candidate; an absolute energy of a respectively corresponding training data candidate; one or more C3 statistics of a respectively corresponding training data candidate; a Friedrich coefficient of a respectively corresponding training data candidate; a Fast Fourier Transform centroid of a respectively corresponding training data candidate; and/or one or more Dickey-Fuller statistics of a respectively corresponding training data candidate. Those having ordinary skill in the art will appreciate that these are mere non-limiting examples of features that can be extracted from and/or that can otherwise be associated with a training data candidate. In various aspects, any other suitable features can be implemented as desired.

In any case, each training data candidate can be associated with and/or characterized by m features, for any suitable positive integer m. For example, the training data candidate 1 can include and/or be associated with a training feature 1(1) to a training feature 1(m). Furthermore, the training data candidate n can include and/or be associated with a training feature n(1) to a training feature n(m). In various instances, for any suitable positive integer i with $1 \leq i \leq n$, the i-th feature of each training data candidate can all be of the same type, format, and/or dimensionality as each other. For example, if the training feature 1(1) is one or more scalars, vectors, matrices, tensors, and/or character strings that represents a skewness of the training data candidate 1, then the training feature n(1) can likewise be one or more scalars, vectors, matrices, tensors, and/or character strings that represents a skewness of the training data candidate n. As another example, if the training feature 1(m) is one or more scalars, vectors, matrices, tensors, and/or character strings that represents a binned entropy of the training data candidate 1, then the training feature n(m) can likewise be one or more scalars, vectors, matrices, tensors, and/or character strings that represents a binned entropy of the training data candidate n.

Although not explicitly shown in FIG. 2, in various cases, each training data candidate in the set of training data candidates 106 can be annotated (e.g., can have a respectively corresponding ground-truth annotation). In other cases, however, each training data candidate in the set of training data candidates 106 can be unannotated.

Returning back to FIG. 1, the machine learning model 104 can exhibit any suitable artificial intelligence architecture as desired. For example, in some instances, the machine learning model 104 can exhibit a decision tree architecture. In such case, the machine learning model 104 can include any suitable number and/or arrangement of decision nodes, any suitable decision threshold percentages in such decision nodes, any suitable number and/or arrangement of leaf nodes, and/or any suitable classification threshold percentages in such leaf nodes. As another non-limiting example, the machine learning model 104 can exhibit a neural network architecture. In such case, the machine learning model 104 can include any suitable number of layers (e.g., input layer, one or more hidden layers, output layer), any suitable numbers of neurons in various layers (e.g., different layers can have the same and/or different numbers of neurons as each other), any suitable activation functions (e.g., sigmoid, softmax, hyperbolic tangent, rectified linear unit) in various neurons (e.g., different neurons can have the same and/or different activation functions as each other), and/or any suitable interneuron connections (e.g., forward connections, skip connections, recurrent connections). As those having ordinary skill in the art will appreciate, the machine learning model 104 can exhibit any other suitable architecture as desired, such as a support vector machine architecture, a linear and/or logistic regression architecture, and/or a naïve Bayes architecture.

In any case, the machine learning model 104 can be configured to analyze and/or otherwise receive as input a training data candidate from the set of training data candidates 106. Accordingly, it can be desired to train the machine learning model 104 via the set of training data candidates 106. As explained herein, the smart AI training/deployment system 102 can facilitate such training.

In various embodiments, the smart AI training/deployment system 102 can comprise a processor 108 (e.g., computer processing unit, microprocessor) and a computer-readable memory 110 that is operably and/or operatively and/or communicatively connected/coupled to the processor 108. The computer-readable memory 110 can store computer-executable instructions which, upon execution by the processor 108, can cause the processor 108 and/or other components of the smart AI training/deployment system 102 (e.g., receiver component 112, feature component 114, selection component 116, training component 118, deployment component 120, and/or confidence component 122) to perform one or more acts. In various embodiments, the computer-readable memory 110 can store computer-executable components (e.g., receiver component 112, feature component 114, selection component 116, training component 118, deployment component 120, and/or confidence component 122), and the processor 108 can execute the computer-executable components.

In various embodiments, the smart AI training/deployment system 102 can comprise a receiver component 112. In various aspects, the receiver component 112 can electronically receive and/or otherwise electronically access the set of training data candidates 106 and/or the machine learning model 104. In various instances, the receiver component 112 can electronically retrieve the set of training data candidates 106 and/or the machine learning model 104 from any suitable centralized and/or decentralized data structures (not shown). In any case, the receiver component 112 can electronically obtain and/or access the set of training data candidates 106 and/or the machine learning model 104, so that other components of the smart AI training/deployment system 102 can electronically interact with the set of training data candidates 106 and/or with the machine learning model 104.

In various embodiments, the smart AI training/deployment system 102 can further comprise a feature component 114. In various aspects, as described herein, the feature component 114 can electronically compute one or more feature distributions exhibited by the set of training data candidates 106.

In various embodiments, the smart AI training/deployment system 102 can further comprise a selection component 116. In various instances, as described herein, the selection component 116 can electronically identify, within the set of training data candidates 106, a strict subset of training data candidates, where one or more feature distributions of the strict subset match the one or more feature distributions of the set of training data candidates 106.

In various embodiments, the smart AI training/deployment system 102 can further comprise a training component 118. In various cases, as described herein, the training component 118 can electronically train the machine learning model 104 on the strict subset, rather than on the set of training data candidates 106. In various aspects, this can be referred to as "smart training" of the machine learning model 104.

In various embodiments, the receiver component 112 can receive and/or otherwise access a set of deployed data candidates on which it is desired to execute, post-training, the machine learning model 104. In various aspects, the smart AI training/deployment system 102 can further comprise a deployment component 120, and the deployment component 120 can, as described herein, electronically determine whether the machine learning model 104 can be reliably executed on the set of deployed data candidates. If so, the deployment component 120 can cause and/or permit the machine learning model 104 to be executed on the set of deployed data candidates. If not, however, the deployment component 120 can prohibit and/or prevent the machine learning model 104 from being executed on the set of deployed data candidates. In various instances, this can be referred to as "smart deployment" of the machine learning model 104.

In various embodiments, the smart AI training/deployment system 102 can further comprise a confidence component 122. In various instances, as described herein, the confidence component 122 can electronically compute a confidence score for any given data candidate on which the machine learning model 104 is desired to be executed.

Figure 3:
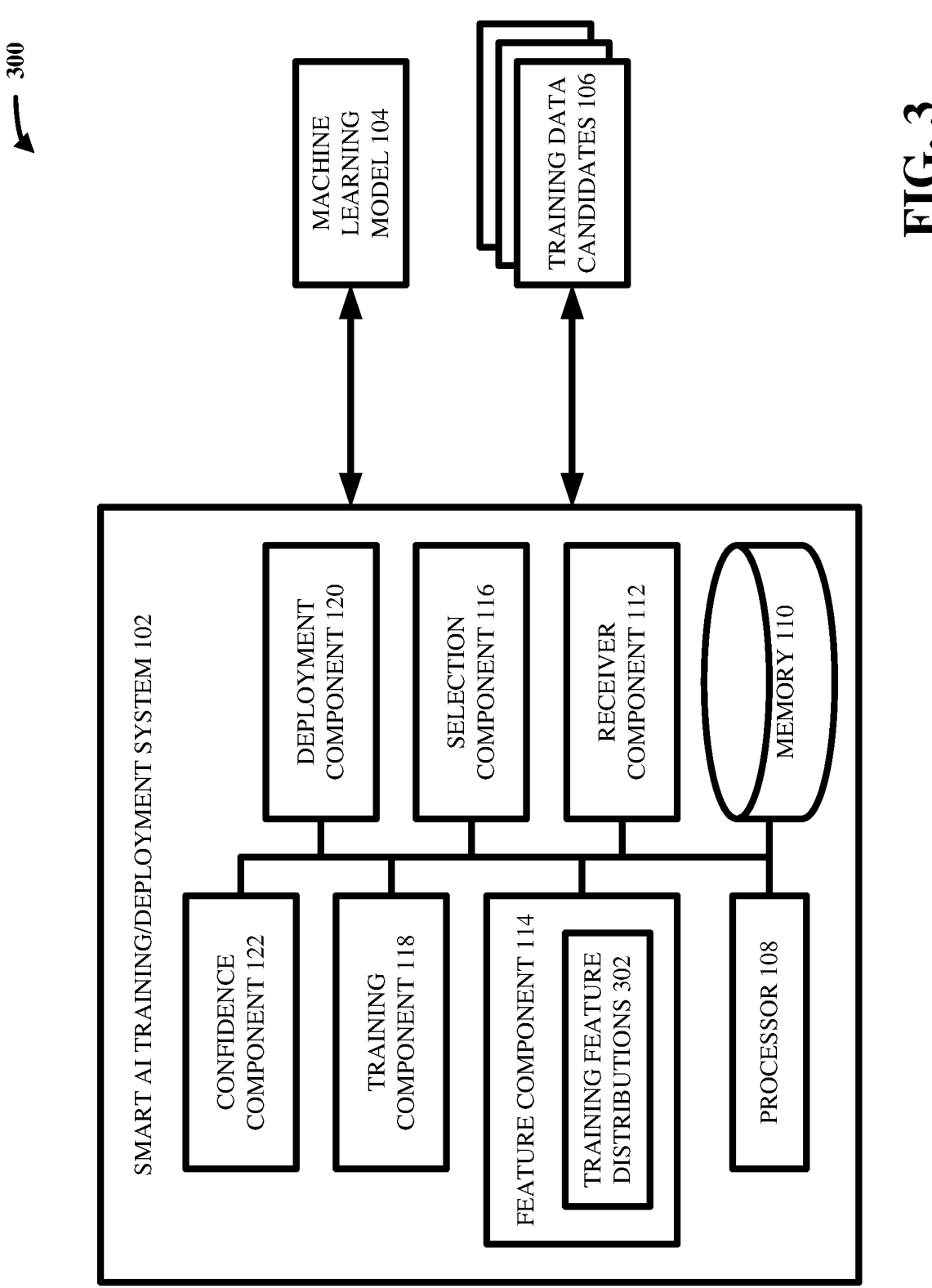
FIG. 3 illustrates a block diagram of an example, non-limiting system including a set of training feature distributions that facilitates smart training and/or smart deployment of machine learning models in accordance with one or more embodiments described herein.

FIG. 3 illustrates a block diagram of an example, non-limiting system 300 including a set of training feature distributions that can facilitate smart training and/or smart deployment of machine learning models in accordance with one or more embodiments described herein. As shown, the system 300 can, in some cases, comprise the same components as the system 100, and can further comprise a set of training feature distributions 302.

In various embodiments, the feature component 114 can electronically generate the set of training feature distributions 302, based on the set of training data candidates 106. This is described in more detail with respect to FIG. 4.

FIG. 4 illustrates an example, non-limiting block diagram 400 showing how the set of training feature distributions 302 can be computed based on the set of training data candidates 106 in accordance with one or more embodiments described herein.

As mentioned above, the set of training data candidates 106 can include a total of n training data candidates, with each training data candidate being associated with and/or described by m features. Accordingly, the set of training feature distributions 302 can include m training feature distributions (e.g., a training feature distribution 1 to a training feature distribution m), with each of such training feature distributions having a cardinality and/or count that is equal to n.

For example, all n of the training data candidates can have a first feature. Specifically, the training data candidate 1 has a training feature 1(1), and the training data candidate n has a training feature n(1) that is of the same type, format, and/or dimensionality as the training feature 1(1). So, the feature component 114 can electronically tabulate, in normalized and/or non-normalized fashion, a frequency distribution and/or a probability density distribution of such n total first features. In some cases, if such tabulated distribution is a normal (e.g., Gaussian) distribution, then such tabulated distribution can be expressed as a mean, variance, and/or median of the first feature computed across all n of the data candidates in the set of training data candidates 106. In other cases, if such tabulated distribution is a gamma distribution, then such tabulated distribution can be expressed as a shape parameter, a rate parameter, and/or a median of the first feature computed across all n of the data candidates in the set of training data candidates 106. In any case, the feature component 114 can electronically tabulate a distribution (e.g., no matter the shape and/or type of distribution) that describes how the first feature varies across all n of the data candidates in the set of training data candidates 106, and such tabulated distribution can be referred to as the training feature distribution 1.

As another example, all n of the training data candidates can have a last feature. Specifically, the training data candidate 1 has a training feature 1(m), and the training data candidate n has a training feature n(m) that is of the same type, format, and/or dimensionality as the training feature 1(m). So, the feature component 114 can electronically tabulate, in normalized and/or non-normalized fashion, a frequency distribution and/or a probability density distribution of such n total last features. Just as above, if such tabulated distribution is a normal (e.g., Gaussian) distribution, then such tabulated distribution can be expressed as a mean, variance, and/or median of the last feature computed across all n of the data candidates in the set of training data candidates 106. Also as mentioned above, if such tabulated distribution is a gamma distribution, then such tabulated distribution can be expressed as a shape parameter, a rate parameter, and/or a median of the last feature computed across all n of the data candidates in the set of training data candidates 106. In any case, the feature component 114 can electronically tabulate a distribution (e.g., no matter the shape and/or type of the distribution) that describes how the last feature varies across all n of the data candidates in the set of training data candidates 106, and such tabulated distribution can be referred to as the training feature distribution m.

More generally, all n of the training data candidates can have a k-th feature for any suitable positive integer k where $1 \leq k \leq m$ (e.g., the training data candidate 1 can have a training feature 1(k) (not shown), and the training data candidate n can have a training feature n(k) (not shown)). Thus, the feature component 114 can electronically tabulate, in normalized and/or non-normalized fashion, a frequency distribution and/or a probability density distribution of such n total k-th features. Again, such tabulated distribution can be expressed as a mean, variance, and/or median if it is a normal (e.g., Gaussian) distribution, and/or such tabulated distribution can be expressed as a shape parameter, rate parameter, and/or median if it is a gamma distribution. In any case, the feature component 114 can electronically tabulate a distribution (e.g., no matter the shape and/or type of the distribution) that describes how the k-th feature varies across all n of the data candidates in the set of training data candidates 106, and such tabulated distribution can be referred to as the training feature distribution k (not shown).

In any case, the feature component 114 can electronically compute, calculate, and/or otherwise tabulate the training feature distribution 1 to the training feature distribution m, and the training feature distribution 1 to the training feature distribution m can be collectively considered as the set of training feature distributions 302.

Figure 5:
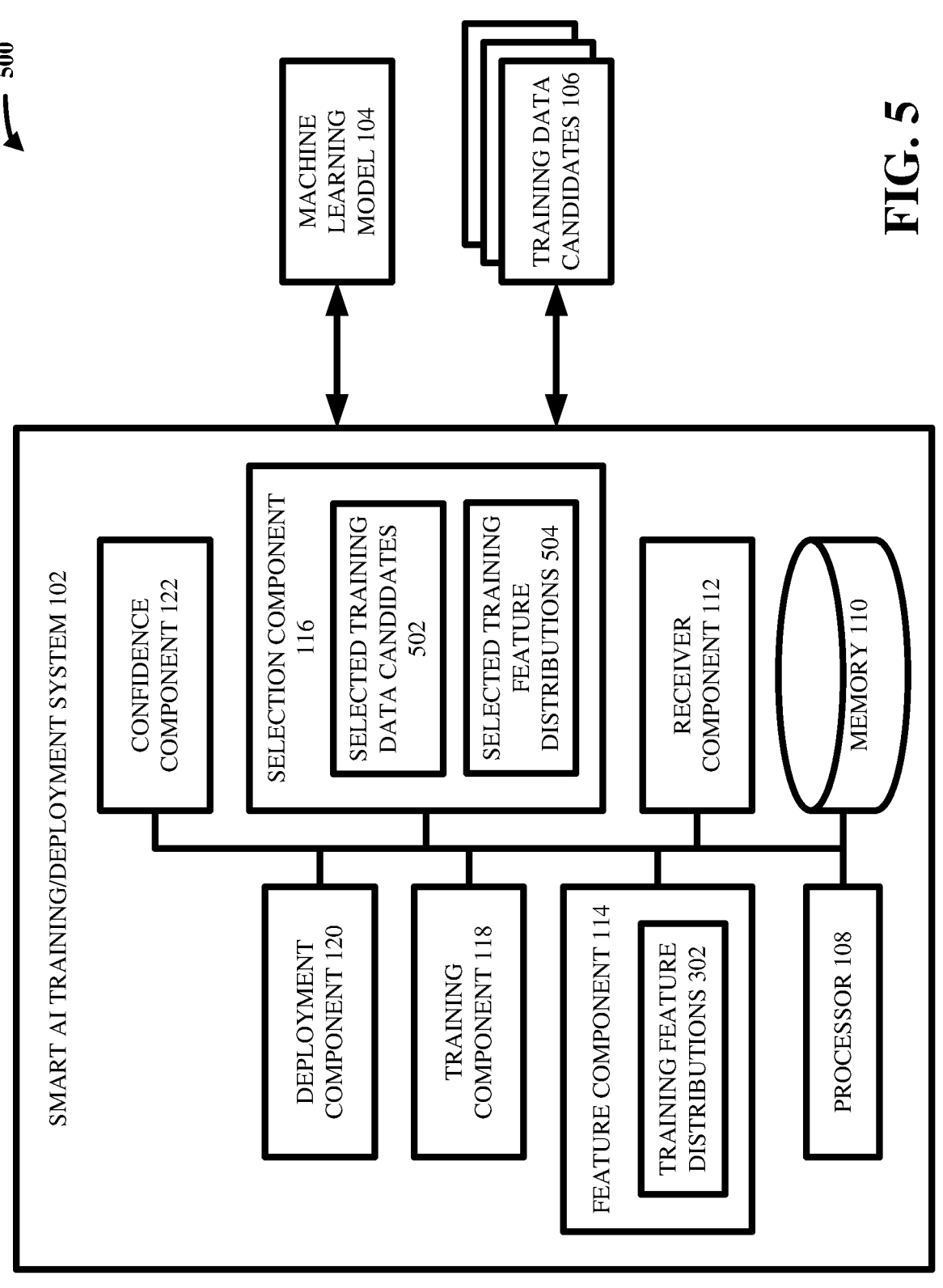
FIG. 5 illustrates a block diagram of an example, non-limiting system including a set of selected training data candidates and a set of selected training feature distributions that facilitates smart training and/or smart deployment of machine learning models in accordance with one or more embodiments described herein.

FIG. 5 illustrates a block diagram of an example, non-limiting system 500 including a set of selected training data candidates and a set of selected training feature distributions that can facilitate smart training and/or smart deployment of machine learning models in accordance with one or more embodiments described herein. As shown, the system 500 can, in some cases, comprise the same components as the system 300, and can further comprise a set of selected training data candidates 502 and/or a set of selected training feature distributions 504.

In various embodiments, the selection component 116 can electronically identify and/or choose, from the set of training data candidates 106, the set of selected training data candidates 502, where the set of selected training data candidates 502 has a smaller cardinality than the set of training data candidates 106. That is, the set of selected training data candidates 502 can contain fewer data candidates than the set of training data candidates 106. Moreover, in various cases, the selection component 116 can electronically compute the set of selected training feature distributions 504 based on the set of selected training data candidates 502, and the set of selected training feature distributions 504 can respectively match the set of training feature distributions 302. In other words, the selection component 116 can electronically identify a strict subset of the set of training data candidates 106, where such strict subset exhibits feature distributions that match the set of training feature distributions 302. This is further described with respect to FIGS. 6-8.

Figure 6:
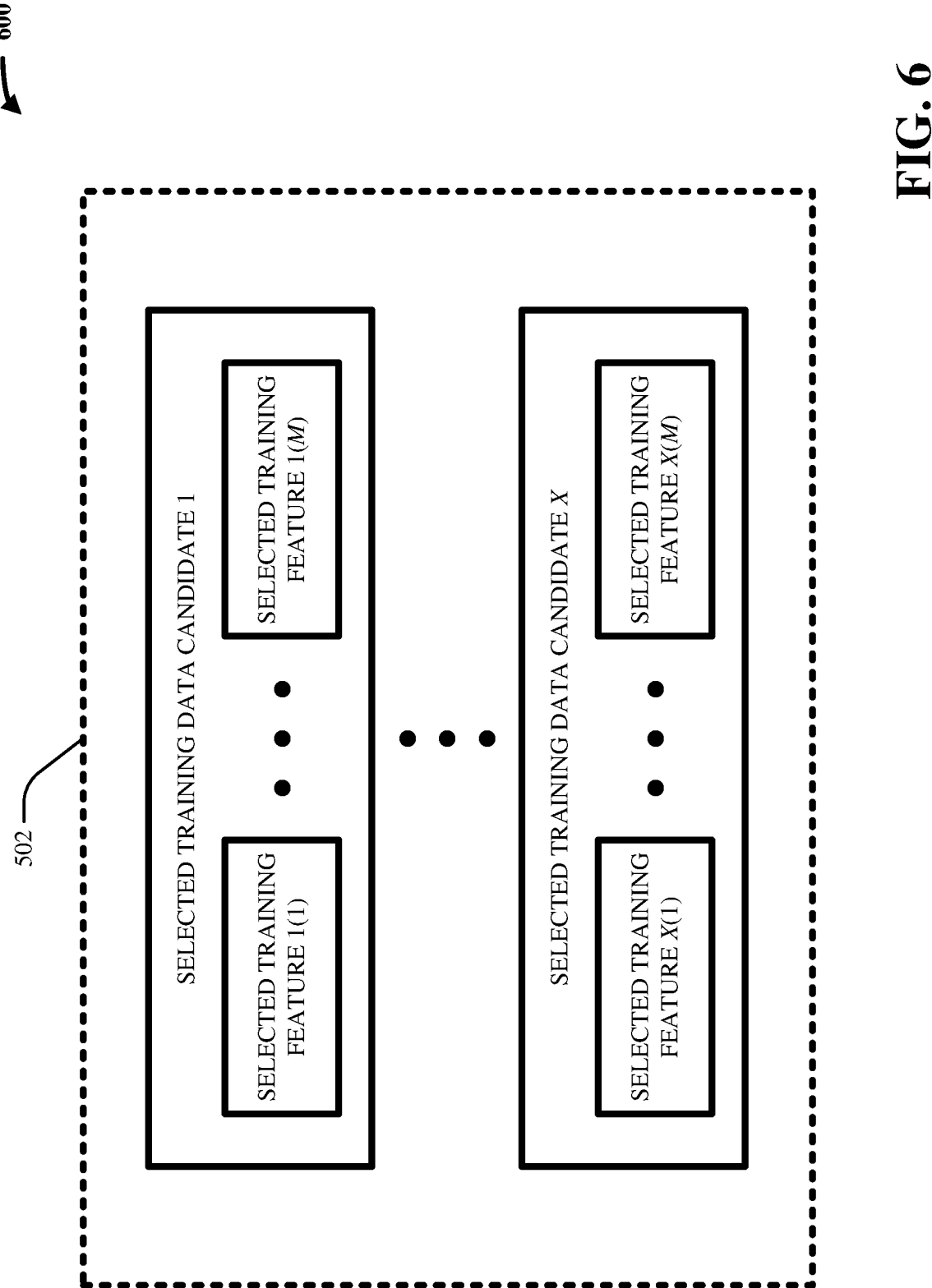
FIG. 6 illustrates an example, non-limiting block diagram of a set of selected training data candidates in accordance with one or more embodiments described herein.

FIG. 6 illustrates an example, non-limiting block diagram 600 of a set of selected training data candidates in accordance with one or more embodiments described herein. That is, FIG. 6 depicts a non-limiting, example embodiment of the set of selected training data candidates 502.

As shown, in various aspects, the set of selected training data candidates 502 can include x data candidates for any suitable positive integer x where $1 \leq x \leq n$: a selected training data candidate 1 to a selected training data candidate x. Moreover, each of the set of selected training data candidates 502 can have come from, can have been chosen from, and/or can have been selected from the set of training data candidates 106. Accordingly, because each of the set of training data candidates 106 can be associated with m features, each of the set of selected training data candidates 502 can likewise be associated with m features. For example, the selected training data candidate 1 can have m features: a selected training feature 1(1) to a selected training feature 1(m). Likewise, the selected training data candidate x can have m features: a selected training feature x(1) to a selected training feature x(m).

In various embodiments, the selection component 116 can electronically generate the set of selected training feature distributions 504, based on the set of selected training data candidates 502. This is described in more detail with respect to FIG. 7.

Figure 7:
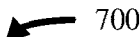
FIG. 7 illustrates an example, non-limiting block diagram showing how a set of selected training feature distributions can be computed in accordance with one or more embodiments described herein.

FIG. 7 illustrates an example, non-limiting block diagram 700 showing how the set of selected training feature distributions 504 can be computed based on the set of selected training data candidates 502 in accordance with one or more embodiments described herein.

As mentioned above, the set of selected training data candidates 502 can include a total of x (e.g., which is less than n) selected training data candidates, with each selected training data candidate being associated with and/or described by m features. Accordingly, the set of selected training feature distributions 504 can include m selected training feature distributions (e.g., a selected training feature distribution 1 to a selected training feature distribution m), with each of such selected training feature distributions having a cardinality and/or count that is equal to x (e.g., not equal to n).

For example, all x of the selected training data candidates can have a first feature (e.g., the selected training data candidate 1 has a selected training feature 1(1), and the selected training data candidate x has a selected training feature x(1) that is of the same type, format, and/or dimensionality as the selected training feature 1(1)). So, much like the feature component 114, the selection component 116 can electronically tabulate, in normalized and/or non-normalized fashion, a frequency distribution and/or a probability density distribution of such x total first features. As above, if such tabulated distribution is a normal distribution, then it can be expressed as a mean, variance, and/or median of the first feature computed across all x of the data candidates in the set of selected training data candidates 502. In contrast, if such tabulated distribution is a gamma distribution, then it can be expressed as a shape parameter, rate parameter, and/or median of the first feature computed across all x of the data candidates in the set of selected training data candidates 502. In any case, the selection component 116 can electronically tabulate a distribution (e.g., no matter the shape and/or type of distribution) that describes how the first feature varies across all x of the data candidates in the set of selected training data candidates 502, and such tabulated distribution can be referred to as the selected training feature distribution 1.

As another example, all x of the selected training data candidates can have a last feature (e.g., the selected training data candidate 1 has a selected training feature 1(m), and the selected training data candidate x has a selected training feature x(m) that is of the same type, format, and/or dimensionality as the selected training feature 1(m)). So, the selection component 116 can electronically tabulate, in normalized and/or non-normalized fashion, a frequency distribution and/or a probability density distribution of such x total last features. Again, such tabulated distribution can be expressed as and/or represented by a mean, variance, and/or median if it is a normal distribution, and/or such tabulated distribution can be expressed as and/or represented by a shape parameter, rate parameter, and/or median if it is a gamma distribution. In any case, the selection component 116 can electronically tabulate a distribution (e.g., no matter the shape and/or type of the distribution) that describes how the last feature varies across all x of the data candidates in the set of selected training data candidates 502, and such tabulated distribution can be referred to as the selected training feature distribution m.

More generally, all x of the selected training data candidates can have a k-th feature for any suitable positive integer k where $1 \leq k \leq m$ (e.g., the selected training data candidate 1 can have a selected training feature 1(k) (not shown), and the selected training data candidate x can have a selected training feature x(k) (not shown)). Thus, the selection component 116 can electronically tabulate, in normalized and/or non-normalized fashion, a frequency distribution and/or a probability density distribution of such x total k-th features. Once more, such tabulated distribution can be expressed as and/or represented by a mean, variance, and/or median if it is a normal distribution, and/or such tabulated distribution can be expressed as and/or represented by a shape parameter, rate parameter, and/or median if it is a gamma distribution. In any case, the selection component 116 can electronically tabulate a distribution (e.g., no matter the shape and/or type of the distribution) that describes how the k-th feature varies across all x of the data candidates in the set of selected training data candidates 502, and such tabulated distribution can be referred to as the selected training feature distribution k (not shown).

In any case, the selection component 116 can electronically compute, calculate, and/or otherwise tabulate the selected training feature distribution 1 to the selected training feature distribution m, and the selected training feature distribution 1 to the selected training feature distribution m can be collectively considered as the set of selected training feature distributions 504.

In various embodiments, the selection component 116 can electronically choose/identify the set of selected training data candidates 502, such that the set of selected training feature distributions 504 respectively match the set of training feature distributions 302. This is explained in more detail with respect to FIG. 8.

Figure 8:
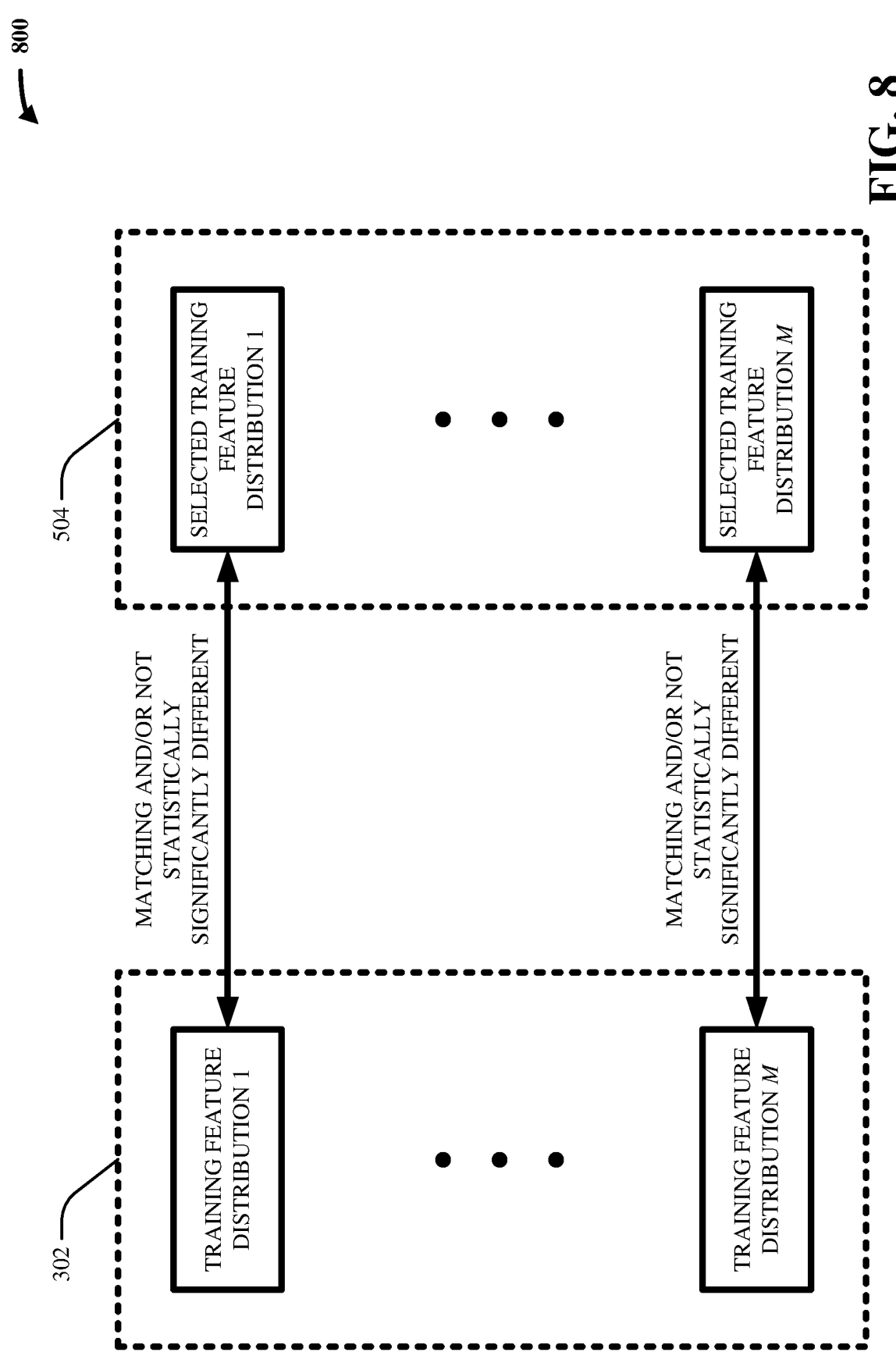
FIG. 8 illustrates an example, non-limiting block diagram showing how a set of training feature distributions can be respectively compared to a set of selected training feature distributions in accordance with one or more embodiments described herein.

FIG. 8 illustrates an example, non-limiting block diagram 800 showing how the set of training feature distributions 302 can be respectively compared to the set of selected training feature distributions 504 in accordance with one or more embodiments described herein.

As mentioned above, the set of training feature distributions 302 can include m distributions: a training feature distribution 1 to a training feature distribution m. As also mentioned above, the set of selected training feature distributions 504 can likewise include m distributions, a selected training feature distribution 1 to a selected training feature distribution m. Accordingly, the set of selected training feature distributions 504 can be considered as respectively corresponding in one-to-one fashion with the set of training feature distributions 302.

For example, as mentioned above, the training feature distribution 1 can convey how the first feature is distributed across all n data candidates in set of training data candidates 106, and the selected training feature distribution 1 can convey how the first feature is distributed across all x data candidates in set of selected training data candidates 502. Thus, the training feature distribution 1 can be considered as respectively corresponding to the selected training feature distribution 1. In various aspects, the selection component 116 can choose/identify the set of selected training data candidates 502, such that the training feature distribution 1 matches the selected training feature distribution 1. In other words, it can be the case that a statistical hypothesis test (e.g., any suitable statistical hypothesis test, such as a z-test, a t-test, and/or a Kolmogorov-Smirnov test) would conclude that the training feature distribution 1 is not statistically significantly different from the selected training feature distribution 1 (e.g., when a statistical hypothesis test is performed to compare the training feature distribution 1 to the selected training feature distribution 1, such statistical hypothesis test can yield a p-value that is greater than 0.05, which can indicate that it cannot be concluded that the training feature distribution 1 and the selected training feature distribution 1 are statistically significantly different).

Likewise, as mentioned above, the training feature distribution m can convey how the m-th feature is distributed across all n data candidates in set of training data candidates 106, and the selected training feature distribution m can convey how the m-th feature is distributed across all x data candidates in set of selected training data candidates 502. Thus, the training feature distribution m can be considered as respectively corresponding to the selected training feature distribution m. Just as above, the selection component 116 can choose/identify the set of selected training data candidates 502, such that the training feature distribution m matches the selected training feature distribution m. That is, it can be the case that a statistical hypothesis test (e.g., z-test, t-test, Kolmogorov-Smirnov test) would conclude that the training feature distribution m is not statistically significantly different from the selected training feature distribution m (e.g., when a statistical hypothesis test is performed to compare the training feature distribution m to the selected training feature distribution m, such statistical hypothesis test can yield a p-value that is greater than 0.05, which can indicate that it cannot be concluded that the training feature distribution m and the selected training feature distribution m are statistically significantly different).

In any case, the selection component 116 can electronically select, choose, and/or identify the set of selected training data candidates 502, such that the set of selected training feature distributions 504 respectively match the set of training feature distributions 302. More specifically, the selection component 116 can accomplish this by: initializing the set of selected training data candidates 502 as empty, iteratively adding data candidates from the set of training data candidates 106 into the set of selected training data candidates 502, and checking at each iteration whether the set of selected training feature distributions 504 yet matches the set of training feature distributions 302.

In various embodiments, once the selection component 116 identifies/chooses the set of selected training data candidates 502, the training component 118 can electronically train (e.g., in supervised fashion if each training data candidate is annotated; in unsupervised fashion and/or reinforcement learning fashion if each training data candidate is unannotated) the machine learning model 104 on the set of selected training data candidates 502, instead of on the set of training data candidates 106. Because the set of selected training data candidates 502 can have a lesser cardinality than the set of training data candidates 106 (e.g., x≤n), there can be a lower likelihood of overtraining/overfitting when the machine learning model 104 is trained on the set of selected training data candidates 502 than would be the case if the machine learning model 104 were instead trained on the set of training data candidates 106. Moreover, because the set of selected training feature distributions 504 can match the set of training feature distributions 302, the set of selected training data candidates 502 can be considered as being substantively equivalent, for training purposes, to the set of training data candidates 106, notwithstanding the smaller cardinality of the set of selected training data candidates 502. In other words, the set of selected training data candidates 502 can be considered as excluding training data candidates that would be substantively redundant for purposes of training the machine learning model 104. In still other words, the machine learning model 104 can achieve a certain level of performance (e.g., accuracy, precision, recall) if it were trained on the set of training data candidates 106, and the machine learning model 104 can achieve substantially the same certain level of performance if it were instead trained on the set of selected training data candidates 502, since the set of selected training data candidates 502 and the set of training data candidates 106 have matching feature distributions.

Therefore, the machine learning model 104 can be trained on the set of selected training data candidates 502, with a lower likelihood of overtraining/overfitting yet simultaneously while achieving a same and/or commensurate level of performance, as compared to if the machine learning model 104 were instead trained on the set of training data candidates 106. As mentioned above, this can be referred to as "smart training" of the machine learning model 104. Such smart training is clarified with respect to FIG. 9.

Figure 9:
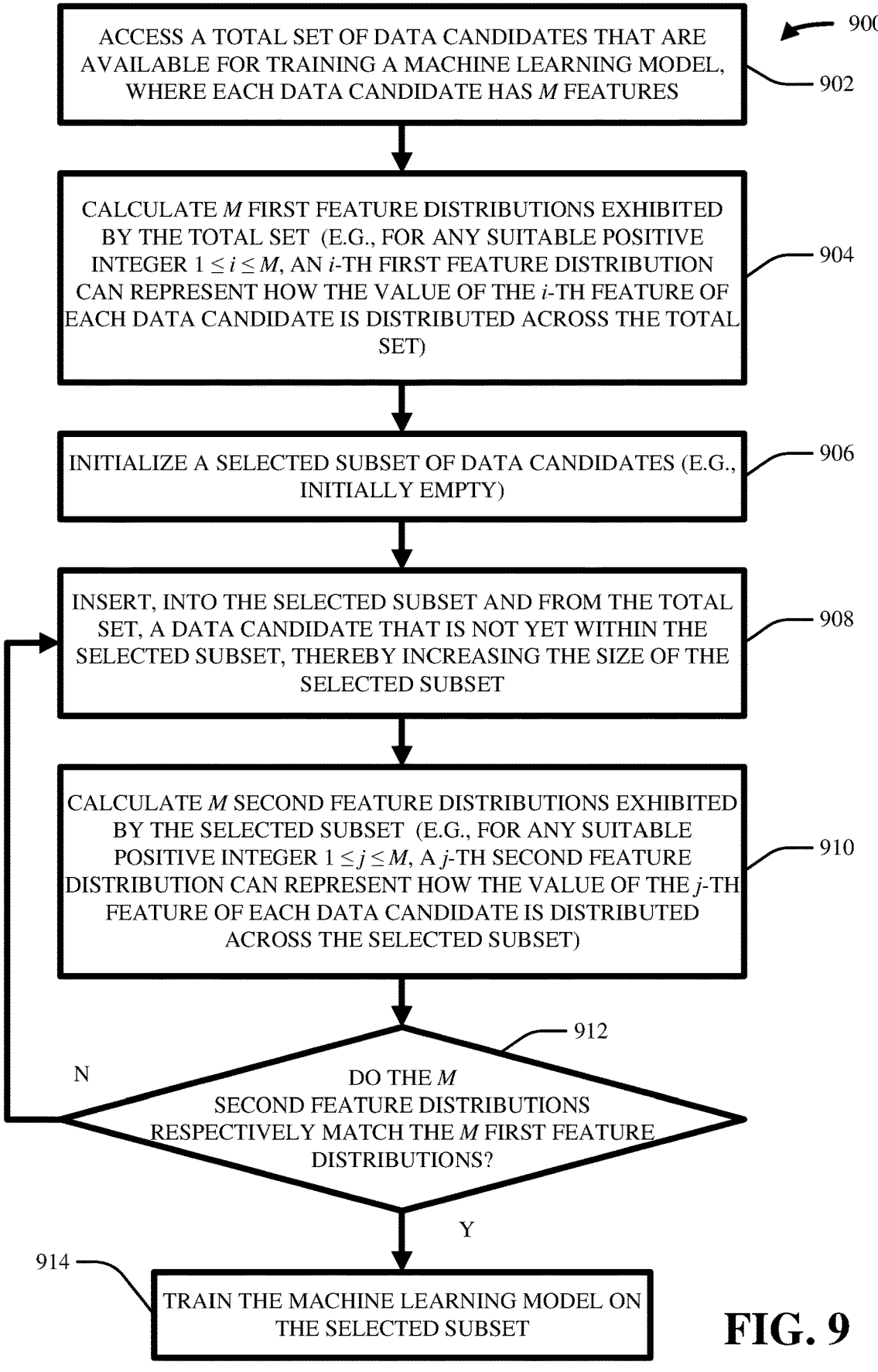
FIG. 9 illustrates a flow diagram of an example, non-limiting computer-implemented method that facilitates smart training of machine learning models in accordance with one or more embodiments described herein.

FIG. 9 illustrates a flow diagram of an example, non-limiting computer-implemented method 900 that can facilitate smart training of machine learning models in accordance with one or more embodiments described herein. In various cases, the smart AI training/deployment system 102 can facilitate the computer-implemented method 900.

In various embodiments, act 902 can include accessing, by a device (e.g., via 112) operatively coupled to a processor, a total set (e.g., 106) of data candidates that are available for training a machine learning model (e.g., 104). In various cases, each data candidate can have m features.

In various aspects, act 904 can include calculating, by the device (e.g., via 114), m first feature distributions (e.g., 302) that are exhibited by the total set. For example, for any suitable positive integer i where 1≤i≤m, an i-th first feature distribution can represent how the value of the i-th feature of each data candidate is distributed (e.g., varies) across the total set.

In various instances, act 906 can include initializing, by the device (e.g., via 116), a selected subset (e.g., 502) of data candidates. In various cases, the selected subset can be initially empty (e.g., can begin as the null set).

In various aspects, act 908 can include inserting, by the device (e.g., via 116), into the selected subset, and from the total set, a data candidate that is not yet within the selected subset. This can cause the size (e.g., cardinality) of the selected subset to increase (e.g., to be incremented by one). In some cases, the inserted data candidate can be chosen randomly from the total set. In other cases, the inserted data candidate can be chosen according to any suitable priority order (e.g., choosing outlying data candidates first). Moreover, in some cases, act 908 can include inserting more than one data candidate into the selected subset at a time (e.g., in such case, the size and/or cardinality of the selected subset can be incremented by more than one).

In various instances, act 910 can include calculating, by the device (e.g., via 116), m second feature distributions (e.g., 504) that are exhibited by the select subset. For example, for any suitable positive integer j where $1 \leq j \leq m$, a j-th second feature distribution can represent how the value of the j-th feature of each data candidate is distributed (e.g., varies) across the selected subset (e.g., in contrast, the j-th first feature distribution can represent how the value of the j-th feature of each data candidate is distributed across the total set).

In various aspects, act 912 can include determining, by the device (e.g., via 116), whether the m second feature distributions respectively match the m first feature distributions. As mentioned above, this determination can be accomplished via application of any suitable statistical hypothesis tests. For instance, for any suitable positive integer k where $1 \leq k \leq m$, a statistical hypothesis test can be performed between the k-th second feature distribution and the k-th first feature distribution, to determine whether the k-th second feature distribution is statistically significantly different from the k-th first feature distribution. If it is the case that the k-th second feature distribution is not statistically significantly different from the k-th first feature distribution for all positive integers k where $1 \leq k \leq m$, then it can be concluded that the m second feature distributions do respectively match the m first feature distributions. In such case, the computer-implemented method 900 can proceed to act 914. On the other hand, if it is the case that the k-th second feature distribution is statistically significantly different from the k-th first feature distribution for at least one positive integer k where $1 \leq k \leq m$, then it can be concluded that the m second feature distributions do not yet respectively match the m first feature distributions. In such case, the computer-implemented method 900 can proceed back to act 908.

Although not explicitly shown in FIG. 9, act 912 can further include visually rendering, on any suitable computer display/screen/monitor (not shown), results of any performed statistical hypothesis tests (e.g., computed p-scores can be visually rendered). In some cases, act 912 can even include visually rendering any of the m second feature distributions and/or any of the m first feature distributions themselves (e.g., graphically presenting violin plots and/or histograms based on such tabulated distributions).

As shown, acts 908-912 can repeat and/or iterate, until the m second feature distributions match the m first feature distributions. At such point, the selected subset can be considered as being complete (e.g., as being substantively equivalent to the total set while also being smaller than the total set).

In various aspects, act 914 can include training, by the device (e.g., via 118), the machine learning model on the selected subset. Accordingly, as described above, the machine learning model can be appropriately trained (e.g., since the selected subset can be substantively equivalent to the total set for training purposes) with reduced risk of overtraining/overfitting (e.g., since the selected subset can be smaller than the total set).

Thus far, the figures have mainly depicted various embodiments of the subject innovation which can facilitate smart training of the machine learning model 104. Now, consider how various embodiments can facilitate smart deployment of the machine learning model 104.

Figure 10:
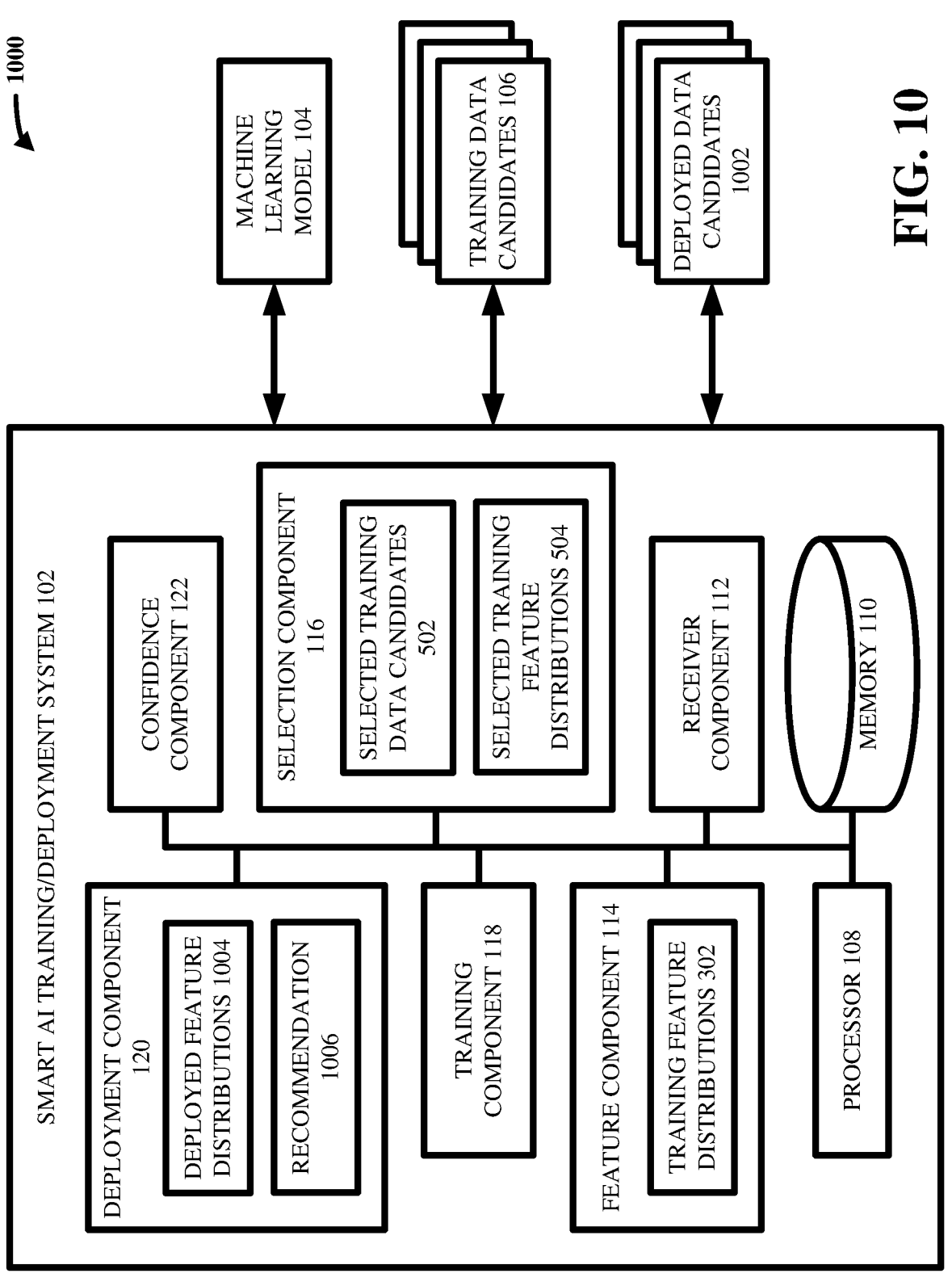
FIG. 10 illustrates a block diagram of an example, non-limiting system including a set of deployed data candidates, a set of deployed feature distributions, and a recommendation that facilitates smart training and/or smart deployment of machine learning models in accordance with one or more embodiments described herein.

FIG. 10 illustrates a block diagram of an example, non-limiting system 1000 including a set of deployed data candidates, a set of deployed feature distributions, and a recommendation that can facilitate smart training and/or smart deployment of machine learning models in accordance with one or more embodiments described herein. As shown, the system 1000 can, in some cases, include the same components as the system 500, and can further include a set of deployed data candidates 1002, a set of deployed feature distributions 1004, and/or a recommendation 1006.

In various embodiments, the receiver component 112 can electronically receive, retrieve, and/or otherwise access a set of deployed data candidates 1002 from any suitable source. In various aspects, the set of deployed data candidates 1002 can include any suitable number of deployed data candidates. In various instances, it can be desired to execute, post-training, the machine learning model 104 on the set of deployed data candidates 1002. Accordingly, each deployed data candidate can have the same data format and/or data dimensionality as a training data candidate, described above. That is, a deployed data candidate can be considered as any suitable piece of electronic information that is associated with one or more features, attributes, and/or characteristics. This is shown in more detail with respect to FIG. 11.

Figure 11:
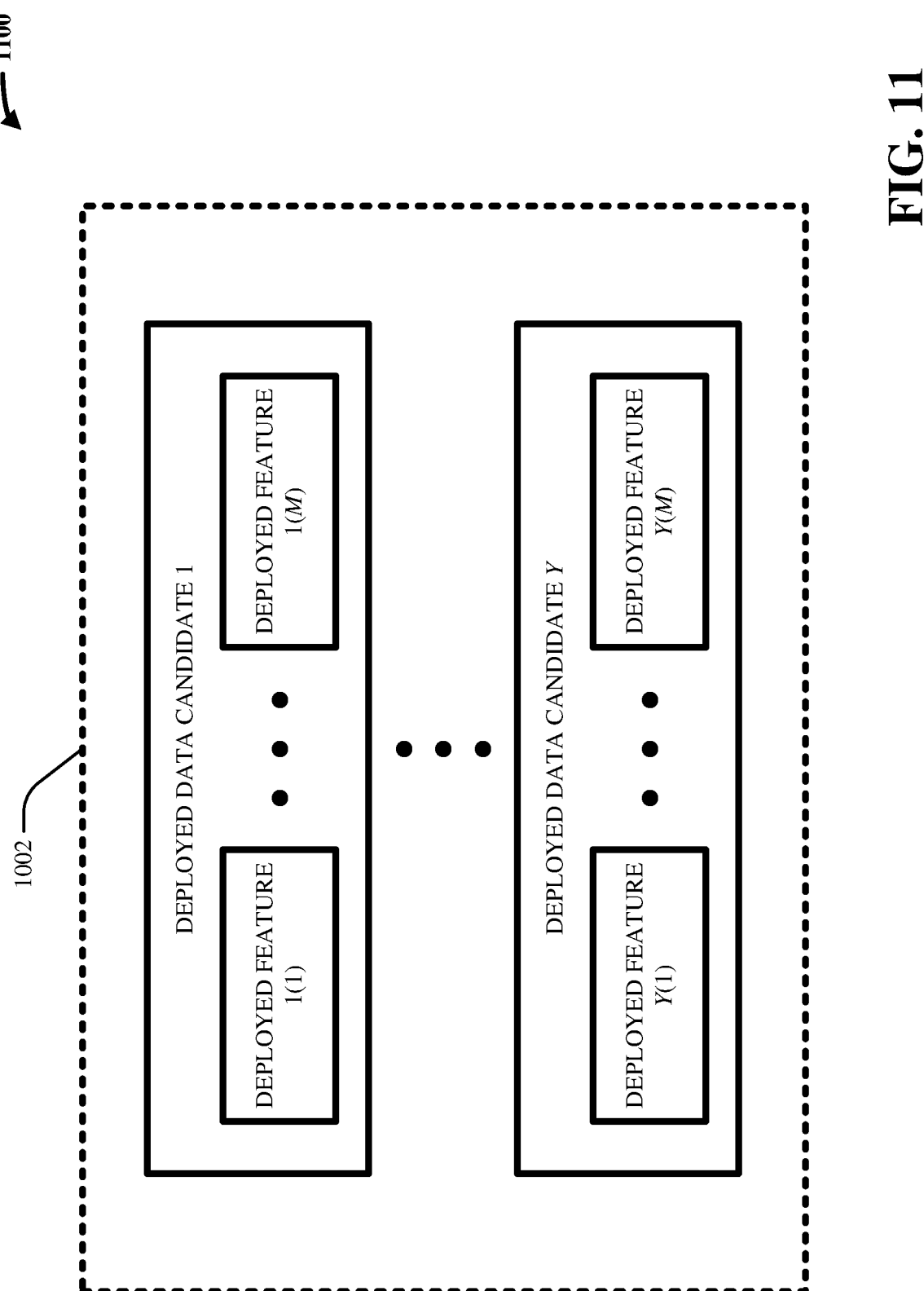
FIG. 11 illustrates an example, non-limiting block diagram of a set of deployed data candidates in accordance with one or more embodiments described herein.

FIG. 11 illustrates an example, non-limiting block diagram 1100 of a set of deployed data candidates in accordance with one or more embodiments described herein. That is, FIG. 11 depicts a non-limiting, example embodiment of the set of deployed data candidates 1002.

As shown, in various aspects, the set of deployed data candidates 1002 can include y data candidates for any suitable positive integer y: a deployed data candidate 1 to a deployed data candidate y. Since each training data candidate can be associated with and/or characterized by m features, each deployed data candidate can likewise associated with and/or described by m features. For example, the deployed data candidate 1 can include and/or be associated with a deployed feature 1(1) to a deployed feature 1(m). Furthermore, the deployed data candidate y can include and/or be associated with a deployed feature y(1) to a deployed feature y(m).

In various embodiments, the deployment component 120 can electronically generate the set of deployed feature distributions 1004, based on the set of deployed data candidates 1002. This is described in more detail with respect to FIG. 12.

Figure 12:
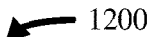
FIG. 12 illustrates an example, non-limiting block diagram showing how a set of deployed feature distributions can be computed in accordance with one or more embodiments described herein.

FIG. 12 illustrates an example, non-limiting block diagram 1200 showing how the set of deployed feature distributions 1004 can be computed based on the set of deployed data candidates 1002 in accordance with one or more embodiments described herein.

As mentioned above, the set of deployed data candidates 1002 can include a total of y deployed data candidates, with each deployed data candidate being associated with and/or described by m features. Accordingly, the set of deployed feature distributions 1004 can include m deployed feature distributions (e.g., a deployed feature distribution 1 to a deployed feature distribution m), with each of such deployed feature distributions having a cardinality and/or count that is equal to y.

For example, all y of the deployed data candidates can have a first feature (e.g., the deployed data candidate 1 has a deployed feature 1(1), and the deployed data candidate y has a deployed feature y(1) that is of the same type, format, and/or dimensionality as the deployed feature 1(1)). So, much like the feature component 114 and the selection component 116, the deployment component 120 can electronically tabulate, in normalized and/or non-normalized fashion, a frequency distribution and/or a probability density distribution of such y total first features. As above, such tabulated distribution can be expressed as a mean, variance, and/or median if it is a normal (e.g., Gaussian) distribution; in other cases, such tabulated distribution can be expressed as a shape parameter, rate parameter, and/or median if it is a gamma distribution. In any case, the deployment component 120 can electronically tabulate a distribution (e.g., no matter the shape and/or type of distribution) that describes how the first feature varies across all y of the data candidates in the set of deployed data candidates 1002, and such tabulated distribution can be referred to as the deployed feature distribution 1.

As another example, all y of the deployed data candidates can have a last feature (e.g., the deployed data candidate 1 has a deployed feature 1(m), and the deployed data candidate y has a deployed feature y(m) that is of the same type, format, and/or dimensionality as the deployed feature 1(m). So, the deployment component 120 can electronically tabulate, in normalized and/or non-normalized fashion, a frequency distribution and/or a probability density distribution of such y total last features. Again, such tabulated distribution can be expressed as a mean, variance, and/or median if it is a normal (e.g., Gaussian) distribution; in other cases, such tabulated distribution can be expressed as a shape parameter, rate parameter, and/or median if it is a gamma distribution. In any case, the deployment component 120 can electronically tabulate a distribution (e.g., no matter the shape and/or type of the distribution) that describes how the last feature varies across all y of the data candidates in the set of deployed data candidates 1002, and such tabulated distribution can be referred to as the deployed feature distribution m.

More generally, all y of the selected training data candidates can have a k-th feature for any suitable positive integer k where $1 \leq k \leq m$ (e.g., the deployed data candidate 1 can have a deployed feature 1(k) (not shown), and the deployed data candidate y can have a deployed feature y(k) (not shown)). Thus, the deployment component 120 can electronically tabulate, in normalized and/or non-normalized fashion, a frequency distribution and/or a probability density distribution of such y total k-th features. Once more, such tabulated distribution can be expressed as a mean, variance, and/or median if it is a normal (e.g., Gaussian) distribution; in other cases, such tabulated distribution can be expressed as a shape parameter, rate parameter, and/or median if it is a gamma distribution. In any case, the deployment component 120 can electronically tabulate a distribution (e.g., no matter the shape and/or type of the distribution) that describes how the k-th feature varies across all y of the data candidates in the set of deployed data candidates 1002, and such tabulated distribution can be referred to as the deployed feature distribution k (not shown).

In any case, the deployment component 120 can electronically compute, calculate, and/or otherwise tabulate the deployed feature distribution 1 to the deployed feature distribution m, and the deployed feature distribution 1 to the deployed feature distribution m can be collectively considered as the set of deployed feature distributions 1004.

In various embodiments, the deployment component 120 can electronically compare the set of deployed feature distributions 1004 to the set of training feature distributions 302. Based on such comparison, the deployment component 120 can electronically generate the recommendation 1006. This is explained in more detail with respect to FIG. 13.

Figure 13:
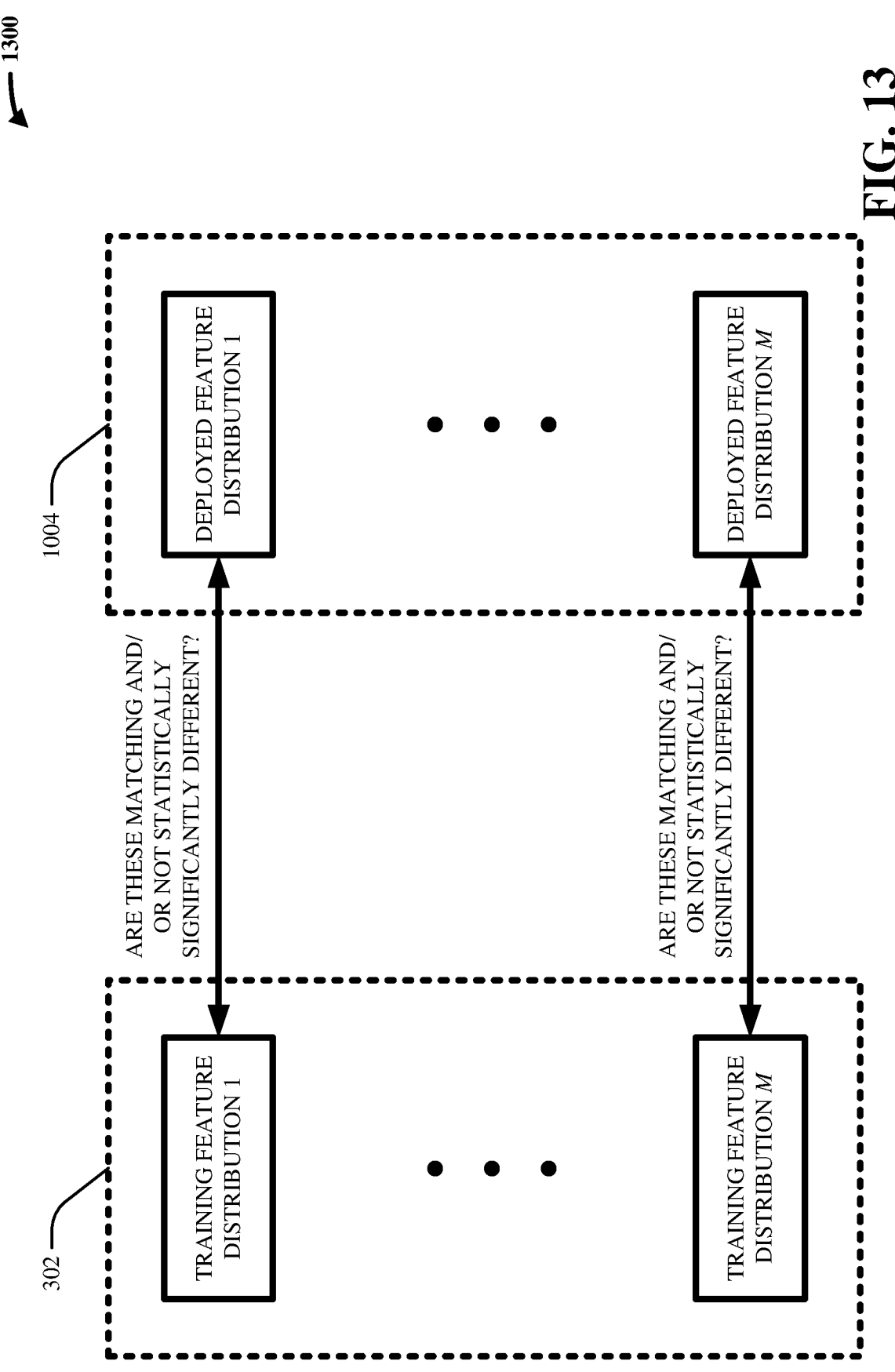
FIG. 13 illustrates an example, non-limiting block diagram showing how a set of training feature distributions can be compared to a set of deployed feature distributions in accordance with one or more embodiments described herein.

FIG. 13 illustrates an example, non-limiting block diagram 1300 showing how the set of training feature distributions 302 can be compared to the set of deployed feature distributions 1004 in accordance with one or more embodiments described herein.

As mentioned above, the set of training feature distributions 302 can include m distributions: a training feature distribution 1 to a training feature distribution m. As also mentioned above, the set of deployed feature distributions 1004 can likewise include m distributions, a deployed feature distribution 1 to a deployed feature distribution m. Accordingly, the set of deployed feature distributions 1004 can be considered as respectively corresponding in one-to-one fashion with the set of training feature distributions 302.

For example, as mentioned above, the training feature distribution 1 can convey how the first feature is distributed across all n data candidates in set of training data candidates 106, and the deployed feature distribution 1 can convey how the first feature is distributed across all y data candidates in set of deployed data candidates 1002. Thus, the training feature distribution 1 can be considered as respectively corresponding to the deployed feature distribution 1. In various aspects, the deployment component 120 can perform any suitable statistical hypothesis test (e.g., z-test, t-test, Kolmogorov-Smirnov test) so as to check whether the training feature distribution 1 matches the deployed feature distribution 1. In various aspects, the statistical hypothesis test can conclude that the training feature distribution 1 is not statistically significantly different from the deployed feature distribution 1 (e.g., the statistical hypothesis test can yield a p-value that is greater than 0.05), or the statistical hypothesis test can instead conclude that the training feature distribution 1 is statistically significantly different from the deployed feature distribution 1 (e.g., the statistical hypothesis test can yield a p-value that is less than 0.05).

Likewise, the training feature distribution m can convey how the m-th feature is distributed across all n data candidates in set of training data candidates 106, and the deployed feature distribution m can convey how the m-th feature is distributed across all y data candidates in set of deployed data candidates 1002. Thus, the training feature distribution m can be considered as respectively corresponding to the deployed feature distribution m. In various aspects, the deployment component 120 can perform any suitable statistical hypothesis test (e.g., z-test, t-test, Kolmogorov-Smirnov test) so as to check whether the training feature distribution m matches the deployed feature distribution m. As above, the statistical hypothesis test can conclude that the training feature distribution m is not statistically significantly different from the deployed feature distribution m (e.g., the statistical hypothesis test can yield a p-value that is greater than 0.05), or the statistical hypothesis test can instead conclude that the training feature distribution m is statistically significantly different from the deployed feature distribution m (e.g., the statistical hypothesis test can yield a p-value that is less than 0.05).

If there exists at least one positive integer c where $1 \leq c \leq m$ and where the c-th deployed feature distribution does not match (e.g., is statistically significantly different from) the c-th training feature distribution, then the deployment component 120 can determine that the set of deployed data candidates 1002 is not sufficiently "similar" to the set of training data candidates 106. Accordingly, the recommendation 1006 can indicate that the machine learning model 104 cannot be reliably executed on the set of deployed data candidates 1002. In such case, the deployment component 120 can electronically transmit the recommendation 1006 to any suitable computing device (not shown), can electronically render the recommendation 1006 on any suitable computer display/screen/monitor (not shown), and/or can otherwise prohibit/prevent the machine learning model 104 from being executed on the set of deployed data candidates 1002.

On the other hand, if the c-th deployed feature distribution does match (e.g., is not statistically significantly different from) the c-th training feature distribution for all positive integers c where 1≤c≤m, then the deployment component 120 can determine that the set of deployed data candidates 1002 is sufficiently "similar" to the set of training data candidates 106. Accordingly, the recommendation 1006 can indicate that the machine learning model 104 can be reliably executed on the set of deployed data candidates 1002. In such case, the deployment component 120 can electronically transmit the recommendation 1006 to any suitable computing device (not shown), can electronically render the recommendation 1006 on any suitable computer display/screen/monitor (not shown), and/or can otherwise cause and/or facilitate the machine learning model 104 to be executed on the set of deployed data candidates 1002.

Although FIG. 13 shows that the deployment component 120 can compare the set of deployed feature distributions 1004 with the set of training feature distributions 302, this is a mere non-limiting example. In some cases, the deployment component 120 can instead compare the set of deployed feature distributions 1004 with the set of selected training feature distributions 504 (e.g., this is possible since the set of training feature distributions 302 can match the set of selected training feature distributions 504).

Therefore, the machine learning model 104 can be executed on the set of deployed data candidates 1002 when the set of deployed feature distributions 1004 match the set of training feature distributions 302 (e.g., and/or match the set of selected training feature distributions 504), and the machine learning model 104 can be not executed on the set of deployed data candidates 1002 when the set of deployed feature distributions 1004 fails to match the set of training feature distributions 302 (e.g., and/or fails to match the set of selected training feature distributions 504). As mentioned above, this can be referred to as "smart deployment" of the machine learning model 104. Such smart deployment is clarified with respect to FIG. 14.

Figure 14:
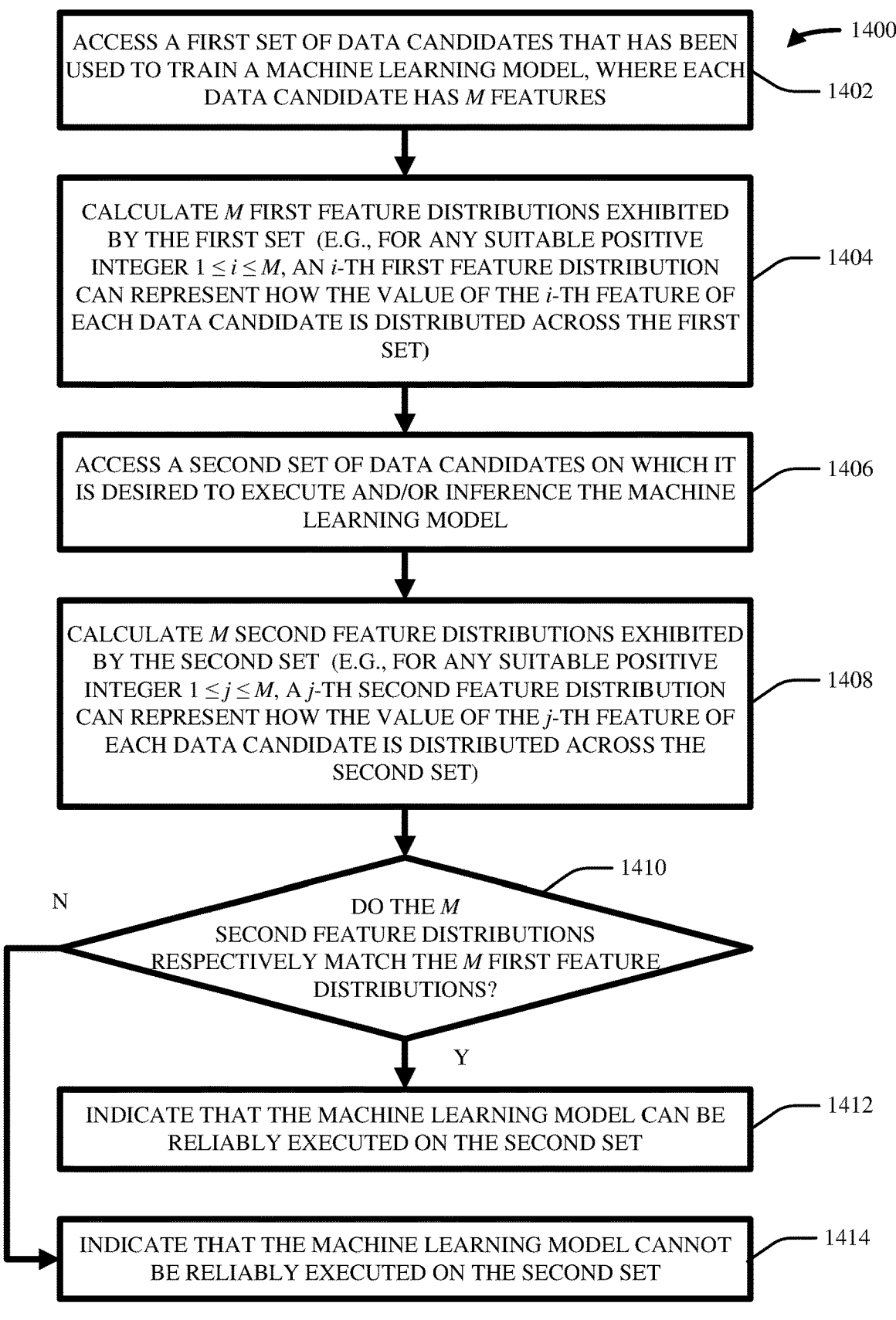
FIG. 14 illustrates a flow diagram of an example, non-limiting computer-implemented method that facilitates smart deployment of machine learning models in accordance with one or more embodiments described herein.

FIG. 14 illustrates a flow diagram of an example, non-limiting computer-implemented method 1400 that can facilitate smart deployment of machine learning models in accordance with one or more embodiments described herein. In various cases, the smart AI training/deployment system 102 can facilitate the computer-implemented method 1400.

In various embodiments, act 1402 can include accessing, by a device (e.g., via 112) operatively coupled to a processor, a first set (e.g., 106 or 502) of data candidates that has been used to train a machine learning model (e.g., 104). In various cases, each data candidate can have m features, for any suitable positive integer m.

In various aspects, act 1404 can include calculating, by the device (e.g., via 114 if 106 is the "first set", or via 116 if 502 is the "first set"), m first feature distributions (e.g., 302 if 106 is the "first set", or 504 if 502 is the "first set") exhibited by the first set. For example, for any suitable positive integer i where 1≤i≤m, an i-th first feature distribution can represent how the value of the i-th feature of each data candidate is distributed (e.g., varies) across the first set.

In various instances, act 1406 can include accessing, by the device (e.g., via 112), a second set (e.g., 1002) of data candidates on which it is desired to executed and/or inference the machine learning model.

In various aspects, act 1408 can include calculating, by the device (e.g., via 120), m second feature distributions (e.g., 1004) exhibited by the second set. For example, for any suitable positive integer j where 1≤j≤m, a j-th second feature distribution can represent how the value of the j-th feature of each data candidate is distributed (e.g., varies) across the second set (e.g., whereas a j-th first feature distribution can represent how the value of the j-th feature of each data candidate is distributed across the first set).

In various aspects, act 1410 can include determining, by the device (e.g., via 120), whether the m second feature distributions respectively match the m first feature distributions. As mentioned above, this determination can be accomplished via application of any suitable statistical hypothesis tests. For instance, for any suitable positive integer k where 1≤k≤m, a statistical hypothesis test can be performed between the k-th second feature distribution and the k-th first feature distribution, to determine whether the k-th second feature distribution is statistically significantly different from the k-th first feature distribution. If it is the case that the k-th second feature distribution is not statistically significantly different from the k-th first feature distribution for all positive integers k where 1≤k≤m, then it can be concluded that the m second feature distributions do respectively match the m first feature distributions. In such case, the computer-implemented method 1400 can proceed to act 1412. On the other hand, if it is the case that the k-th second feature distribution is statistically significantly different from the k-th first feature distribution for at least one positive integer k where 1≤k≤m, then it can be concluded that the m second feature distributions do not respectively match the m first feature distributions. In such case, the computer-implemented method 1400 can proceed to act 1414.

Although not explicitly shown in FIG. 14, act 1410 can further include visually rendering, on any suitable computer display/screen/monitor (not shown), results of any performed statistical hypothesis tests (e.g., computed p-scores can be visually rendered). In some cases, act 1410 can even include visually rendering any of the m second feature distributions and/or any of the m first feature distributions themselves (e.g., graphically presenting violin plots and/or histograms based on such tabulated distributions).

In various aspects, act 1412 can include indicating, by the device (e.g., via 120), that the machine learning model can be reliably executed on the second set.

In various instances, act 1414 can include indicating, by the device (e.g., via 120), that the machine learning model cannot be reliably executed on the second set.

Thus far, regarding smart deployment, the figures have mainly shown how various embodiments of the subject innovation can facilitate smart deployment with respect to a set of deployed data candidates (e.g., 1002). Now, consider how various embodiments described herein can facilitate smart deployment with respect to an individual data candidate.

Figure 15:
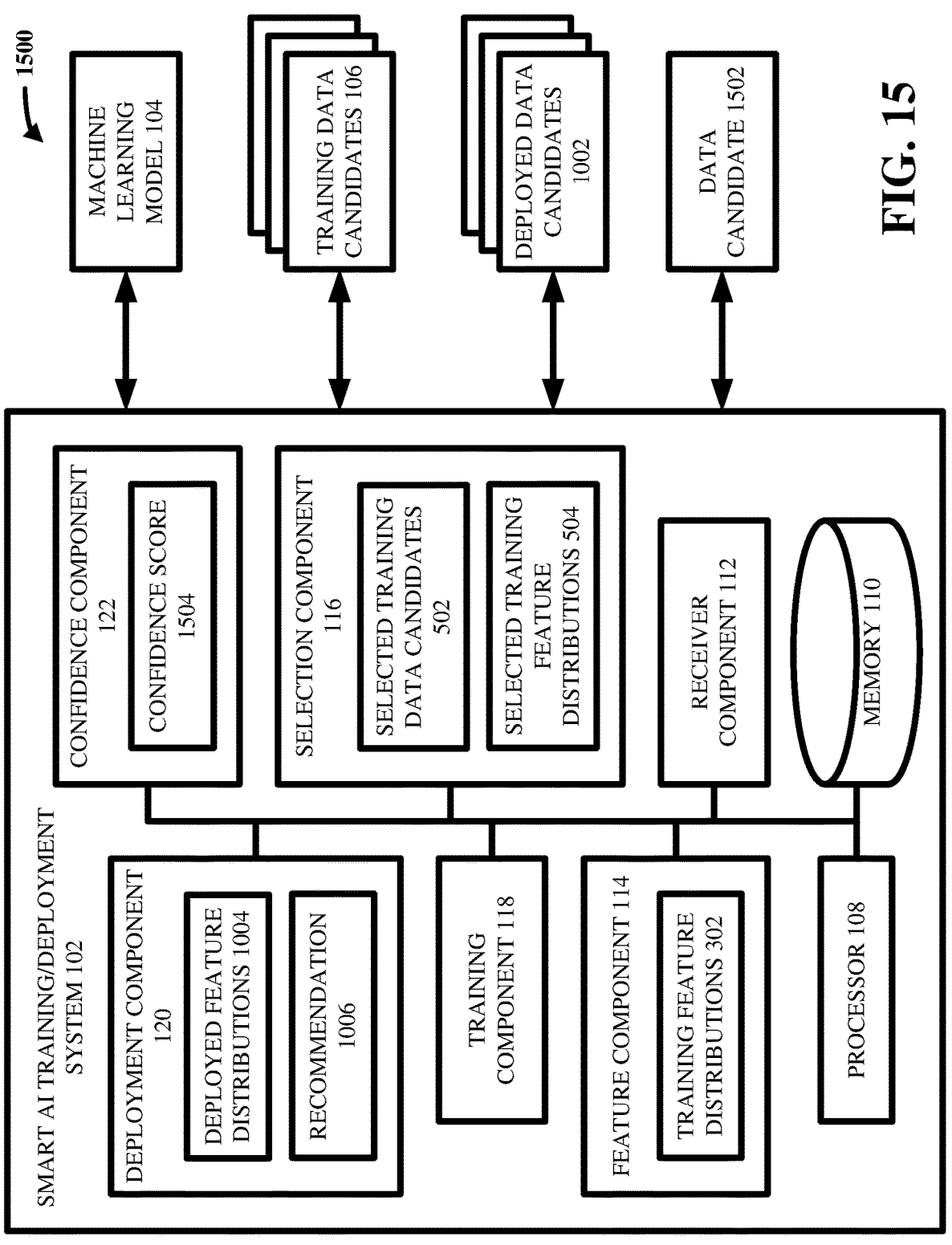
FIG. 15 illustrates a block diagram of an example, non-limiting system including a confidence score that facilitates smart training and/or smart deployment of machine learning models in accordance with one or more embodiments described herein.

FIG. 15 illustrates a block diagram of an example, non-limiting system 1500 including a confidence score that can facilitate smart training and/or smart deployment of machine learning models in accordance with one or more embodiments described herein. As shown, the system 1500 can, in some cases, comprise the same components as the system 1000, and can further comprise a data candidate 1502 and a confidence score 1504.

In various embodiments, the receiver component 112 can electronically receive, retrieve, and/or access the data candidate 1502 from any suitable source. In various aspects, the data candidate 1502 can have the same format and/or dimensionality as a training data candidate and/or as a deployed data candidate, described above. In any case, it can be desired to execute the machine learning model 104 on the data candidate 1502 (e.g., it can be desired to feed the data candidate 1502 as input to the machine learning model 104). In various instances, the confidence component 122 can electronically generate the confidence score 1504, where the confidence score 1504 can quantify and/or represent how reliably and/or how accurately the machine learning model 104 is able to analyze the data candidate 1502. More specifically, the confidence score 1504 can convey how well the data candidate 1502 fits within the set of training feature distributions 302. If the data candidate 1502 fits well within the set of training feature distributions 302, then it can be inferred that the machine learning model 104 is more able to reliably analyze the data candidate 1502. In contrast, if the data candidate 1502 does not fit well within the set of training feature distributions 302, then it can be inferred that the machine learning model 104 is less able to reliably analyze the data candidate 1502. This is further explained with respect to FIG. 16.

Figure 16:
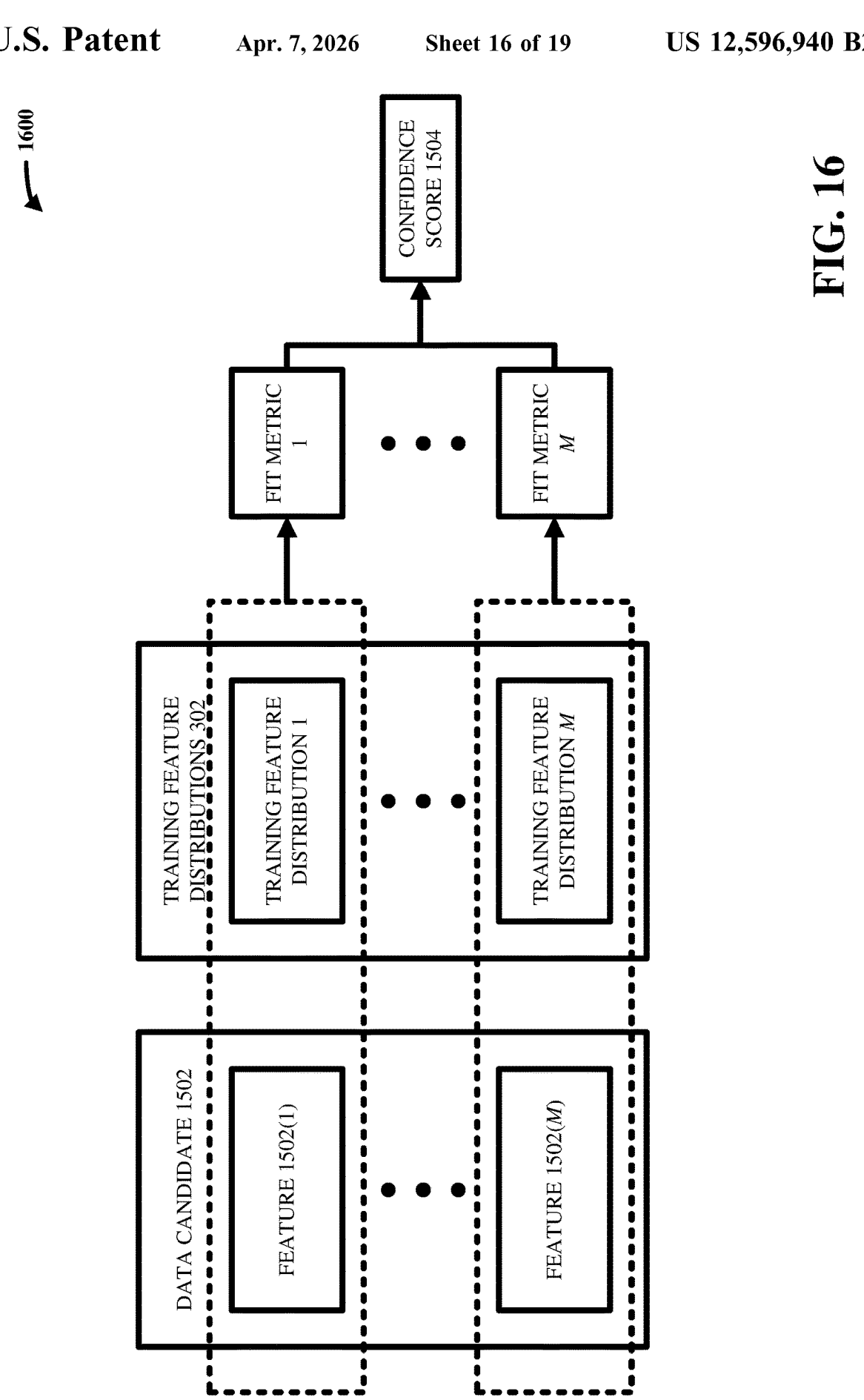
FIG. 16 illustrates an example, non-limiting block diagram showing how a confidence score can be computed in accordance with one or more embodiments described herein.

FIG. 16 illustrates an example, non-limiting block diagram 1600 showing how the confidence score 1504 can be computed based on the data candidate 1502 and/or the set of training feature distributions 302 in accordance with one or more embodiments described herein.

As shown, the data candidate 1502 can have and/or be associated with m features: a feature 1502(1) to a feature 1502(m). In various aspects, the confidence component 122 can electronically quantify how well each of such m features fits within respective ones of the set of training feature distributions 302, and the confidence component 122 can electronically compute the confidence score 1504 based on such quantifications.

For example, in various aspects, the feature 1502(1) can correspond to the training feature distribution 1. Accordingly, the confidence component 122 can calculate a fit metric 1, where the fit metric 1 can be a scalar (e.g., and/or a vector, matrix, and/or tensor, in some cases) whose value indicates how much of an outlier the feature 1502(1) is in view of the training feature distribution 1. As a non-limiting example, the fit metric 1 can be equal to and/or otherwise based on the reciprocal of distance (e.g., absolute value difference) between the feature 1502(1) and a median of the training feature distribution 1 (e.g., such that the fit metric 1 gets higher as the feature 1502(1) gets closer to the median of the training feature distribution 1, and such that the fit metric 1 gets smaller as the feature 1502(1) gets farther from the median of the training feature distribution 1). As another non-limiting example, the fit metric 1 can be equal to and/or otherwise based on the reciprocal of distance (e.g., absolute value difference) between the feature 1502(1) and a mean of the training feature distribution 1 (e.g., such that the fit metric 1 gets higher as the feature 1502(1) gets closer to the mean of the training feature distribution 1, and such that the fit metric 1 gets smaller as the feature 1502(1) gets farther from the mean of the training feature distribution 1).

As another example, in various instances, the feature 1502(m) can correspond to the training feature distribution m. Accordingly, the confidence component 122 can calculate a fit metric m, where the fit metric m can be a scalar (e.g., and/or a vector, matrix, and/or tensor, in some cases) whose value indicates how much of an outlier the feature 1502(m) is in view of the training feature distribution m. Again, as a non-limiting example, the fit metric m can be equal to and/or otherwise based on the reciprocal of distance between the feature 1502(m) and a median of the training feature distribution m (e.g., such that the fit metric m gets higher as the feature 1502(m) gets closer to the median of the training feature distribution m, and such that the fit metric m gets smaller as the feature 1502(m) gets farther from the median of the training feature distribution m). As another non-limiting example, the fit metric m can be equal to and/or otherwise based on the reciprocal of distance between the feature 1502(m) and a mean of the training feature distribution m (e.g., such that the fit metric m gets higher as the feature 1502(m) gets closer to the mean of the training feature distribution m, and such that the fit metric m gets smaller as the feature 1502(m) gets farther from the mean of the training feature distribution m).

In various aspects, the confidence component 122 can aggregate together the fit metric 1 to the fit metric m, and such aggregation can be considered as the confidence score 1504. For example, in some cases, the confidence score 1504 can be equal to and/or otherwise based on a linear combination (e.g., a sum and/or an average) of the fit metric 1 to the fit metric m. In any case, the magnitude of the confidence score 1504 can be higher if the features of the data candidate 1502 fit better into the set of training feature distributions 302 (e.g., if the data candidate 1502 is less of an outlier given the set of training feature distributions 302), and the magnitude of the confidence score 1504 can be lower if the features of the data candidate 1502 fit worse into the set of training feature distributions 302 (e.g., if the data candidate 1502 is more of an outlier given the set of training feature distributions 302).

In various instances, the confidence component 122 can electronically render the confidence score 1504 on any suitable computer display/screen/monitor. In various other instances, the confidence component 122 can electronically transmit the confidence score 1504 to any suitable computing device (not shown), as desired.

In some cases, if the confidence score 1504 fails to satisfy any given threshold, the confidence component 122 can prevent and/or prohibit the machine learning model 104 from being executed on the data candidate 1502. Conversely, if the confidence score 1504 satisfies the given threshold, the confidence component 122 can permit and/or cause the machine learning model 104 to be executed on the data candidate 1502. Again, this can be considered as smart deployment of the machine learning model 104.

Although FIG. 16 shows that the confidence component 122 can compare the data candidate 1502 to the set of training feature distributions 302, this is a mere non-limiting example. In some cases, the confidence component 122 can instead compare the data candidate 1502 with the set of selected training feature distributions 504 (e.g., this is possible since the set of training feature distributions 302 can match the set of selected training feature distributions 504).

FIG. 17 illustrates a flow diagram of an example, non-limiting computer-implemented method 1700 that can facilitate smart training and/or smart deployment of machine learning models in accordance with one or more embodiments described herein. In various cases, the computer-implemented method 1700 can be facilitated by the smart AI training/deployment system 102.

In various embodiments, act 1702 can include accessing, by a device (e.g., via 112) operatively coupled to a processor, a first set of data candidates (e.g., 106) that are available for training of a machine learning model (e.g., 104).

In various aspects, act 1704 can include computing, by the device (e.g., via 114), at least one feature distribution (e.g., 302) of the first set of data candidates.

In various instances, act 1706 can include identifying, by the device (e.g., via 116) and in the first set of data candidates, a strict subset of data candidates (e.g., 502), wherein at least one feature distribution (e.g., 504) of the strict subset of data candidates matches the at least one feature distribution of the first set of data candidates.

In various cases, act 1708 can include training, by the device (e.g., via 118), the machine learning model on the strict subset of data candidates.

Although not explicitly shown in FIG. 17, the identifying the strict subset of data candidates can include: initializing, by the device (e.g., via 116), the strict subset as empty; iteratively inserting, by the device (e.g., via 116) and into the strict subset, data candidates from the first set of data candidates; and determining, by the device (e.g., via 116) and at each iteration, whether the at least one feature distribution of the strict subset now matches the at least one feature distribution of the first set of data candidates by performing at least one statistical hypothesis test (e.g., as explained with respect to FIG. 9). Although not explicitly shown in FIG. 17, the computer-implemented method 1700 can further include: visually rendering, by the device (e.g., via 116) and on an electronic display, results (e.g., p-values and/or violin plots) of the at least one statistical hypothesis test.

Although not explicitly shown in FIG. 17, the computer-implemented method 1700 can further include: accessing, by the device (e.g., via 112), a second set of data candidates (e.g., 1002) that are available for inferencing of the machine learning model; and determining, by the device (e.g., via 120), whether at least one feature distribution (e.g., 1004) of the second set of data candidates matches the at least one feature distribution of the first set of data candidates. In various cases, the determining whether the at least one feature distribution of the second set of data candidates matches the at least one feature distribution of the first set of data candidates can include performing, by the device (e.g., via 120), at least one statistical hypothesis test (e.g., as explained with respect to FIG. 14). In various aspects, the computer-implemented method 1700 can further include: recommending, by the device (e.g., via 120), that the machine learning model is not reliably executable on the second set of data candidates when the at least one feature distribution of the second set of data candidates fails to match the at least one feature distribution of the first set of data candidates.

Although not explicitly shown in FIG. 17, the computer-implemented method 1700 can further include: accessing, by the device (e.g., via 112), a data candidate (e.g., 1502) on which the machine learning model is executable; and computing, by the device (e.g., via 122), a level of confidence (e.g., 1504) with which the machine learning model can be executed on the data candidate, wherein the level of confidence is based on how far at least one feature of the data candidate is from at least one mean or median of the at least one feature distribution of the first set of data candidates (e.g., as explained with respect to FIG. 16).

Accordingly, various embodiments described herein include a computerized tool that can facilitate smart training and/or smart deployment of a machine learning model. In various aspects, smart training can involve identifying a strict subset of training data (e.g., a minimally-required set of training data) from a total set of available training data, where the strict subset exhibits matching feature distributions as the total set. As explained herein, training a machine learning model on such a strict subset can reduce the likelihood of overtraining/overfitting, without reducing the quality of learning accomplished by the machine learning model. Furthermore, in various instances, smart deployment can involve executing and/or recommending execution of a machine learning model on data encountered during deployment (e.g., encountered in the field) only when the feature distributions of such data match the feature distributions of the data on which the machine learning model was trained. Such smart deployment can help to prevent the machine learning model from being executed on data that is not sufficiently within the training domain, which can help to improve the reliability of the machine learning model. A computerized tool that can facilitate smart training and/or smart deployment of machine learning model is certainly a useful and practical application of computers.

Although the herein disclosure mainly treats statistical significance as being defined by a p-value of 0.05, this is a mere non-limiting example. In various aspects, any suitable threshold p-value can be used to delineate statistical significance, as desired.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 18:
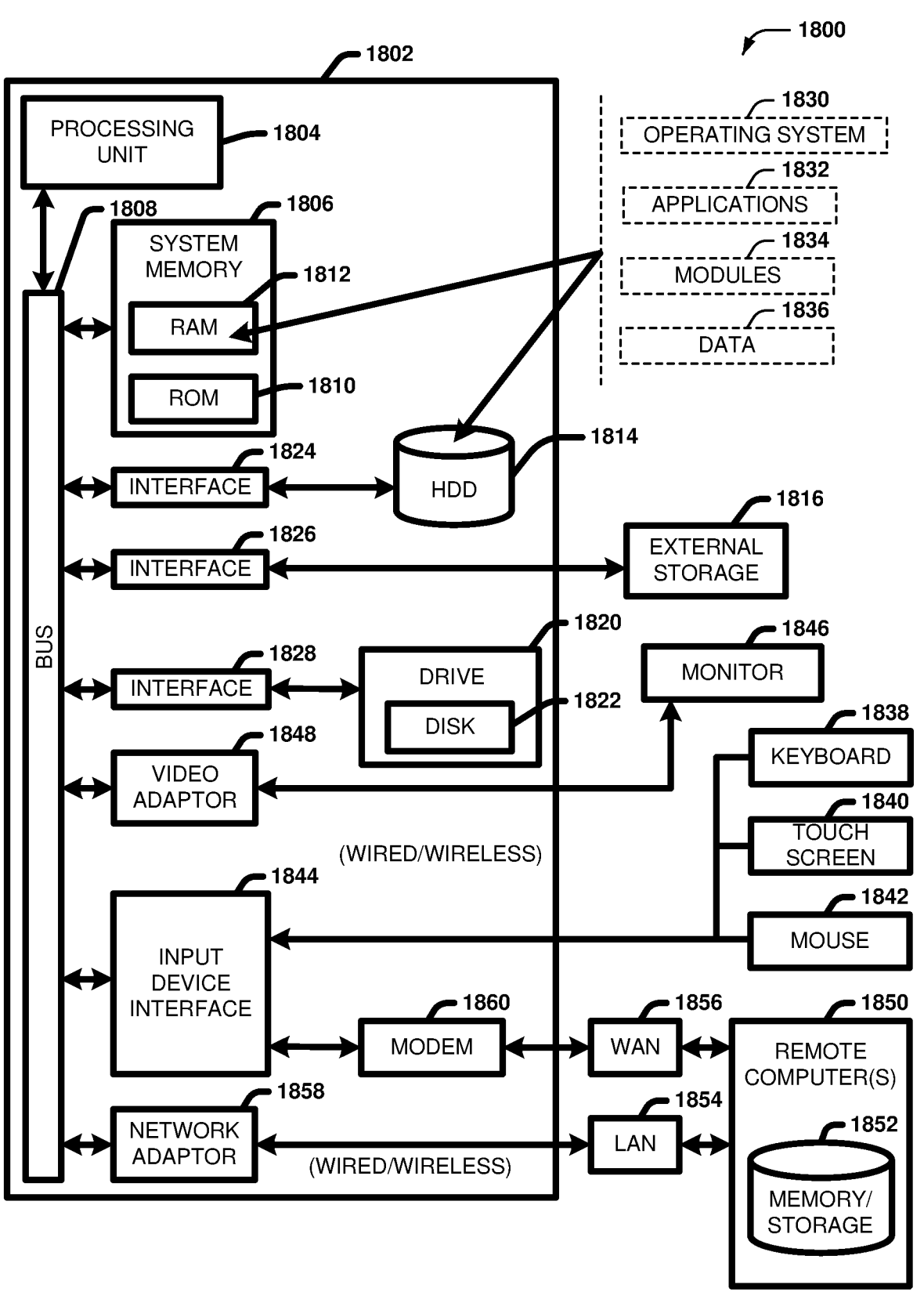
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/ storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 19 is a schematic block diagram of a sample computing environment 1900 with which the disclosed subject matter can interact. The sample computing environment 1900 includes one or more client(s) 1910. The client(s) 1910 can be hardware and/or software (e.g., threads, processes, computing devices). The sample computing environment 1900 also includes one or more server(s) 1930. The server(s) 1930 can also be hardware and/or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The sample computing environment 1900 includes a communication framework 1950 that can be employed to facilitate communications between the client(s) 1910 and the server(s) 1930. The client(s) 1910 are operably connected to one or more client data store(s) 1920 that can be employed to store information local to the client(s) 1910. Similarly, the server(s) 1930 are operably connected to one or more server data store(s) 1940 that can be employed to store information local to the servers 1930.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory configured to store computer-executable components; and
a processor that executes at least one of the computer-executable components that:
accesses a training dataset of training data candidates that are available for training of a machine learning model, wherein each training data candidate of the training dataset comprises a defined set of features;
computes a first group comprising first respective feature distributions for the features of the defined set for an entirety of the training dataset of training data candidates;
iteratively constructs, from an empty set, a strict subset of training data candidates by inserting a different training data candidate from the training dataset to the strict subset at each iteration, until a second group comprising second respective feature distributions for the features of the defined set for an entirety of the strict subset of data training candidates matches the first group according to at least one statistical hypothesis test, wherein the strict subset is less that the entirety of the training dataset and mitigates at least of overtraining or overfitting of the machine learning model being trained using the training dataset;
trains the machine learning model on the strict subset of training data candidates; and
after the training of the machine learning model:
accesses a dataset of deployed data candidates that are available for inferencing using the machine learning model after being deployed for use on real-world data, and
determines whether a third group comprising third respective feature distributions for the features of the defined set for the dataset of deployed data candidates matches the first group according to the at least one statistical hypothesis test.

2. The system of claim 1, wherein the first group and the second group comprise at least one of a frequency distribution or a probability density distribution.

3. The system of claim 1, wherein the at least one of the computer-executable components further:
visually renders, on an electronic display, results of the at least one statistical hypothesis test.

4. The system of claim 3, wherein the results comprise at least one computed p-value associated with the at least one statistical hypothesis test.

5. The system of claim 1, wherein the at least one statistical hypothesis test comprises at least one of a z-test, a t-test, or a Kolmogorov-Smirnov test.

6. The system of claim 1, wherein the at least one of the computer-executable components further:
recommends that the machine learning model is not reliably executable on the dataset of deployed data candidates based on a determination that the third group does not match the first group according to the at least one statistical hypothesis test.

7. The system of claim 1, wherein the at least one of the computer-executable components further:

accesses a data candidate on which the machine learning model is executable; and determines a level of confidence with which the machine learning model can be executed on the data candidate, wherein the level of confidence is based on a distance between at least one feature of the data candidate and at least one of a mean or median of at least one of the first respective feature distributions of the first group.

8. A computer-implemented method, comprising:

accessing, by a system operatively coupled to a processor, a training dataset of training data candidates that are available for training of a machine learning model, wherein each training data candidate of the training dataset comprises a defined set of features;

computing, by the system, a first group comprising first respective feature distributions for the features of the defined set for an entirety of the training dataset of training data candidates;

iteratively constructing, by the system, from an empty set, a strict subset of training data candidates by inserting a different training data candidate from the training dataset to the strict subset at each iteration, until a second group comprising second respective feature distributions for the features of the defined set for an entirety of the strict subset of data training candidates matches the first group according to at least one statistical hypothesis test, wherein the strict subset is less that the entirety of the training dataset and mitigates at least of overtraining or overfitting of the machine learning model being trained using the training dataset;

training, by the system, the machine learning model on the strict subset of training data candidates; and after the training of the machine learning model:

accessing, by the system, a dataset of deployed data candidates that are available for inferencing using the machine learning model after being deployed for use on real-world data; and determining, by the system, whether a third group comprising third respective feature distributions for the features of the defined set for the dataset of deployed data candidates matches the first group according to the at least one statistical hypothesis test.

9. The computer-implemented method of claim 8, wherein the first group and the second group comprise at least one of a frequency distribution or a probability density distribution.

10. The computer-implemented method of claim 8, further comprising:

visually rendering, by the system and on an electronic display, results of the at least one statistical hypothesis test.

11. The computer-implemented method of claim 10, wherein the results comprise at least one computed p-value associated with the at least one statistical hypothesis test.

12. The computer-implemented method of claim 8, further comprising:

after the training of the machine learning model:

accessing, by the system, a dataset of deployed data candidates that are available for inferencing using the machine learning model after being deployed for use on real-world data; and determining, by the system, whether a third group comprising third respective feature distributions for the features of the defined set for the dataset of deployed data candidates matches the first group according to the at least one statistical hypothesis test.

13. The computer-implemented method of claim 12, further comprising:

recommending, by the system, that the machine learning model is not reliably executable on the dataset of deployed data candidates based on a determination that the third group does not match the first group according to the at least one statistical hypothesis test.

14. The computer-implemented method of claim 8, further comprising:

after the training of the machine learning model:

accessing, by the system, a data candidate on which the machine learning model is executable; and computing, by the system, a level of confidence with which the machine learning model can be executed on the data candidate, wherein the level of confidence is based on a distance between at least one feature of the data candidate and at least one of a mean or median of at least one of the first respective feature distributions of the first group.

15. A computer program product for facilitating smart training and smart deployment of machine learning models, the computer program product comprising a computer-readable memory having program instructions embodied therewith, the program instructions executable by a processor to cause the processor to:

access a training dataset of training data candidates that are available for training of a machine learning model, wherein each training data candidate of the training dataset comprises a defined set of features;

compute a first group comprising first respective feature distributions for the features of the defined set for an entirety of the training dataset of training data candidates;

iteratively construct, from an empty set, a strict subset of training data candidates by inserting a different training data candidate from the training dataset to the strict subset at each iteration, until a second group comprising second respective feature distributions for the features of the defined set for an entirety of the strict subset of data training candidates matches the first group according to at least one statistical hypothesis test, wherein the strict subset is less that the entirety of the training dataset and mitigates at least of overtraining or overfitting of the machine learning model being trained using the training dataset;

train the machine learning model on the strict subset of training data candidates; and after the training of the machine learning model:

access a data candidate on which the machine learning model is executable, and determine a level of confidence for execution of the machine learning model on the data candidate, wherein the level of confidence is based on a distance between at least one feature of the data candidate and at least one of a mean or median of at least one of the first respective feature distributions of the first group.

16. The computer program product of claim 15, wherein the first group and the second group comprise at least one of a frequency distribution or a probability density distribution.

17. The computer program product of claim 16, wherein the program instructions are further executable to cause the processor to:

visually render, on an electronic display, results of the at least one statistical hypothesis test.

18. The computer program product of claim 17, wherein the results comprise at least one computed p-value associated with the at least one statistical hypothesis test.

19. The computer program product of claim 15, wherein the program instructions are further executable to cause the processor to:

after the training of the machine learning model:

access a dataset of deployed data candidates that are available for inferencing using the machine learning model after being deployed for use on real-world data; and determine whether a third group comprising third respective feature distributions for the features of the defined set for the dataset of deployed data candidates matches the first group according to the at least one statistical hypothesis test.

20. The computer program product of claim 19, wherein the program instructions are further executable to cause the processor to:

recommend that the machine learning model is not reliably executable on the dataset of deployed data candidates based on a determination that the third group does not match the first group according to the at least one statistical hypothesis test.

\* \* \* \* \*